United States Patent
Harada et al.

(10) Patent No.: US 10,224,545 B2
(45) Date of Patent: *Mar. 5, 2019

(54) ACTIVE MATERIAL, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 75 days.

This patent is subject to a terminal disclaimer.

(21) Appl. No.: 15/432,268

(22) Filed: Feb. 14, 2017

(65) Prior Publication Data

US 2017/0271665 A1   Sep. 21, 2017

(30) Foreign Application Priority Data

Mar. 16, 2016 (JP) .................. 2016-052934

(51) Int. Cl.
| | |
|---|---|
| *H01M 4/485* | (2010.01) |
| *H01M 10/42* | (2006.01) |
| *H01M 10/44* | (2006.01) |
| *B60L 11/18* | (2006.01) |

(Continued)

(52) U.S. Cl.
CPC ......... *H01M 4/485* (2013.01); *B60L 11/1809* (2013.01); *C01G 23/003* (2013.01);
(Continued)

(58) Field of Classification Search
CPC .............. B60L 11/1809; Y02E 60/122; H01M 10/052; H01M 10/425; H01M 10/44;
(Continued)

(56) References Cited

U.S. PATENT DOCUMENTS

2006/0222950 A1   10/2006   Koshina
2009/0042095 A1    2/2009   Inagaki et al.
(Continued)

FOREIGN PATENT DOCUMENTS

| EP | 3 136 473 A1 | 3/2017 |
|---|---|---|
| JP | 2005-267940 | 9/2005 |

(Continued)

OTHER PUBLICATIONS

R. Dominko, et al., "Alkali hexatitanates-$A_2Ti_6O_{13}$ (A=Na, K) as host structure for reversible lithium insertion", Journal of Power Sources, vol. 174, 2007, 5 pgs.

(Continued)

*Primary Examiner* — Brittany L Raymond
(74) *Attorney, Agent, or Firm* — Oblon, McClelland, Maier & Neustadt, L.L.P.

(57) ABSTRACT

According to one embodiment, an active material is provided. The active material includes a composite oxide including yttrium atoms in an orthorhombic crystal structure thereof. Also included in the orthorhombic crystal structure of the composite oxide is at least one selected from the group consisting of alkali metal atoms and alkaline earth metal atoms. Among crystal sites represented by Wyckoff notations in the orthorhombic crystal structure, an occupancy of crystal sites that can be occupied by the alkali metal atoms or by the alkaline earth metal atoms is less than 100%.

14 Claims, 9 Drawing Sheets

(51) Int. Cl.
*C01G 23/00* (2006.01)
*C01G 33/00* (2006.01)
*H01M 10/052* (2010.01)
*H01M 4/02* (2006.01)
*H01M 2/10* (2006.01)

(52) U.S. Cl.
CPC ........ *C01G 33/006* (2013.01); *H01M 10/052* (2013.01); *H01M 10/425* (2013.01); *H01M 10/44* (2013.01); *C01P 2002/72* (2013.01); *C01P 2002/74* (2013.01); *C01P 2002/76* (2013.01); *C01P 2002/77* (2013.01); *C01P 2006/12* (2013.01); *C01P 2006/40* (2013.01); *H01M 2/1077* (2013.01); *H01M 2004/027* (2013.01); *H01M 2220/20* (2013.01); *Y02E 60/122* (2013.01)

(58) Field of Classification Search
CPC ............... H01M 2/1077; H01M 4/485; H01M 2004/027; H01M 2220/20; C01G 23/003; C01G 33/006; C01P 2002/74; C01P 2002/76; C01P 2002/77; C01P 2006/12; C01P 2006/40
See application file for complete search history.

(56) References Cited

U.S. PATENT DOCUMENTS

| | | |
|---|---|---|
| 2012/0104326 A1 | 5/2012 | Song et al. |
| 2012/0328930 A1 | 12/2012 | Inagaki et al. |
| 2017/0062817 A1 | 3/2017 | Inagaki et al. |

FOREIGN PATENT DOCUMENTS

| | | |
|---|---|---|
| JP | 2006-286599 | 10/2006 |
| JP | 2009-43679 | 2/2009 |
| JP | 2013-8493 | 1/2013 |
| JP | 2015-187936 | 10/2015 |

OTHER PUBLICATIONS

Pengfei Wang, et al., "Enhanced lithium storage capability of sodium lithium titanate via lithium-site doping", Journal of Power Sources, (297), 2015, 12 pgs.

I. Belharouak, et al., "$Li_2MTi_6O_{14}$(M=Sr, Ba) new anodes for lithium-ion batteries", Electrochemistry Communications, (5), 2003, 4 pgs.

Izumi Nakai, et al., "Funmatsu X sen Kaisetsu no Jissai (Reality of Powder X-Ray Analysis)", X-Ray Analysis Investigation Conversazione, The Japan Society for Analytical Chemistry, 2002, 7 pgs. (with English Translation).

Extended European Search Report dated Jul. 20, 2017 in European Patent Application No. 17154569.2.

Pengfei Wang, et al., "Improved Lithium Storage Performance of Lithium Sodium Titanate Anode by Titanium Site Substitution with Aluminum", Journal of Power Sources, vol. 293, XP055285710, May 20, 2015, pp. 33-41.

Zonghai Chen, et al., "Titanium-Based Anode Materials for Safe Lithium-Ion Batteries", Advanced Functional Materials, vol. 23 No. 8, XP001581750, Feb. 25, 2013, pp. 959-969.

Damien Dambournet, et al., "$MLi_2Ti_6O_{14}$ (M=Sr, Ba, 2Na) Lithium Insertion Titanate Materials: A Comparative Study", Inorganic Chemistry, vol. 49 No. 6, XP055273926, Mar. 15, 2010, pp. 2822-2826.

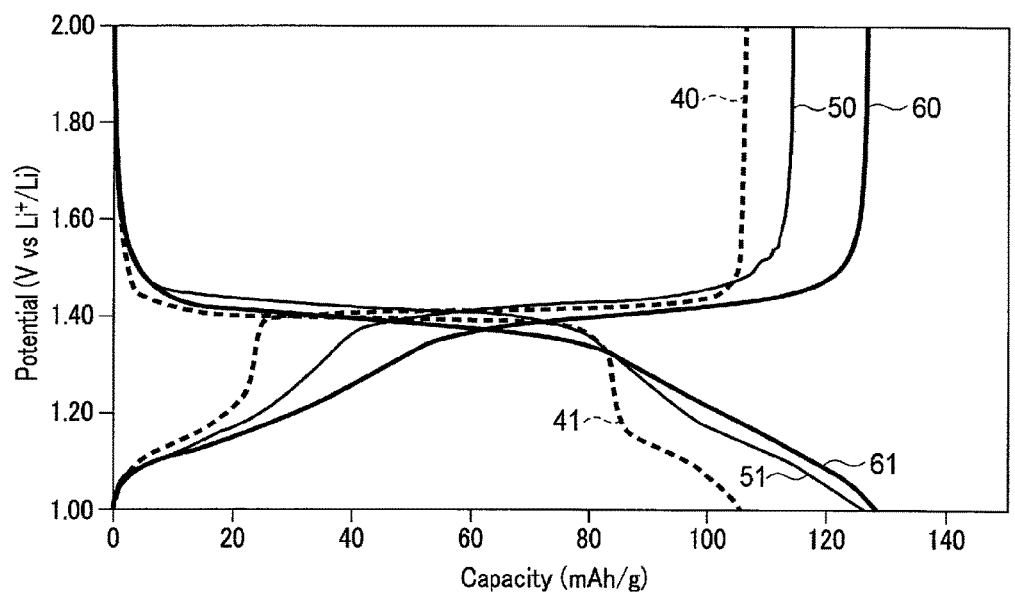
F I G. 1

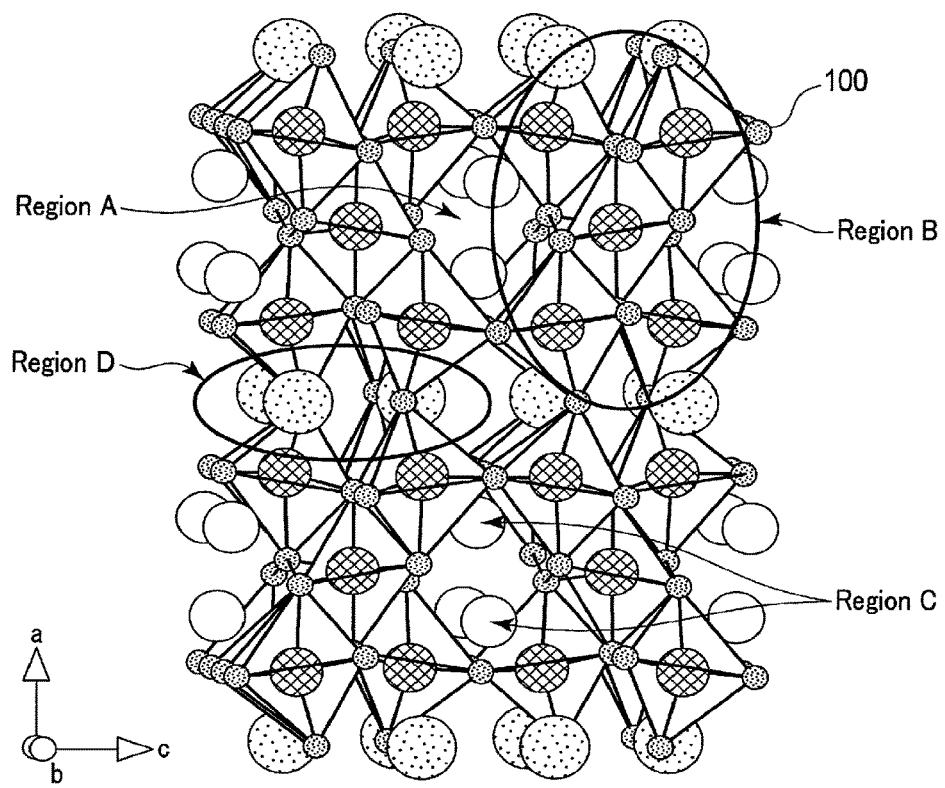
F I G. 3
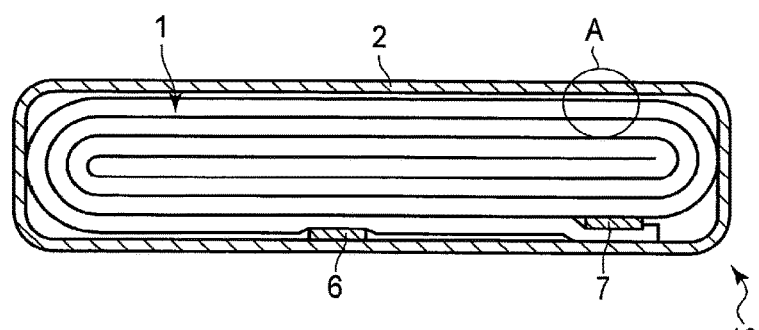
F I G. 4

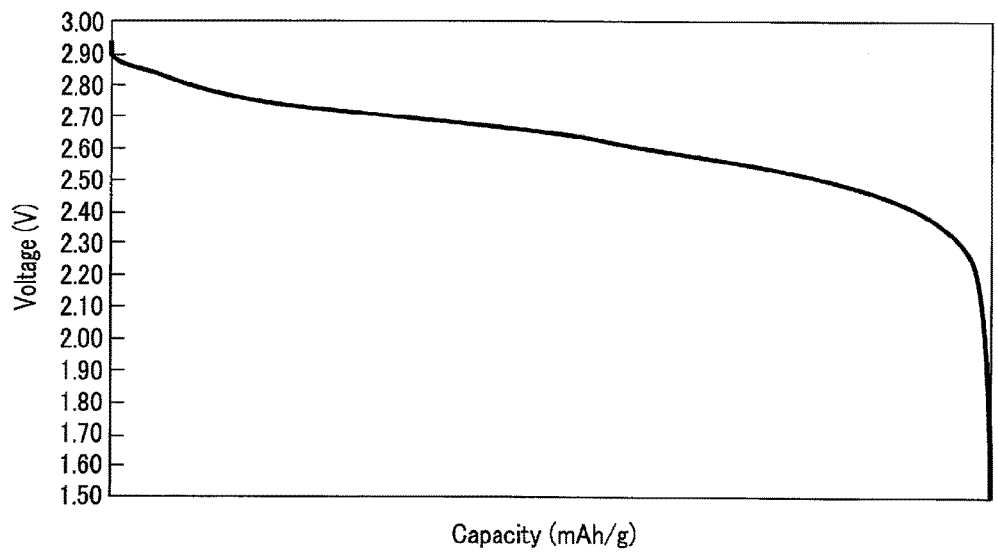
F I G. 10
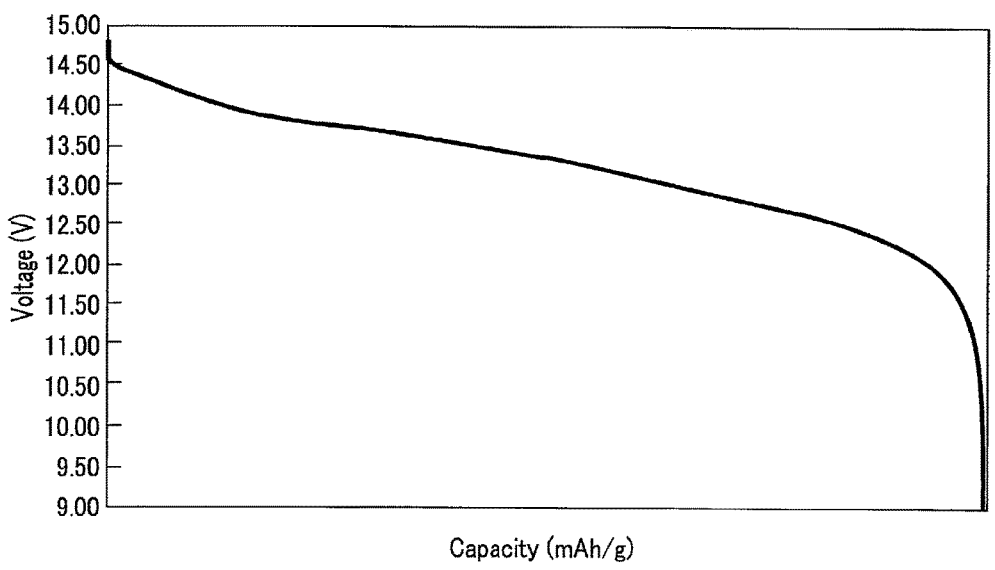
F I G. 11

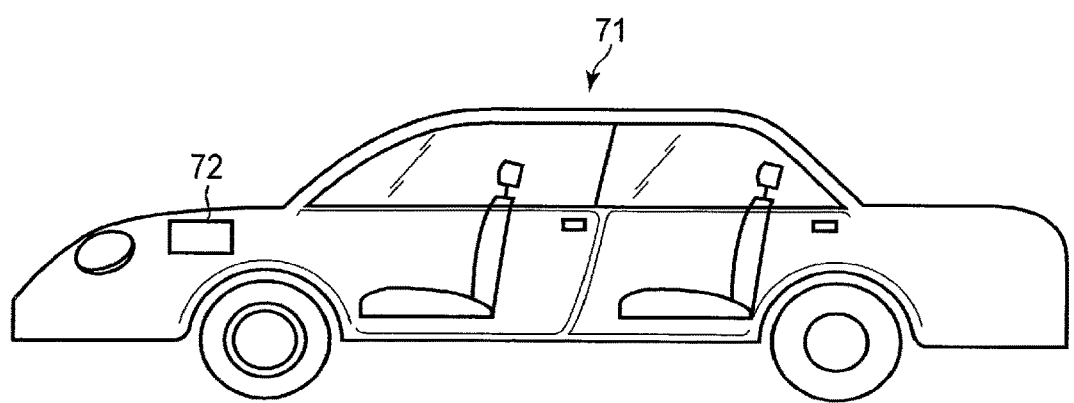
F I G. 12

ACTIVE MATERIAL, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2016-52934, filed Mar. 16, 2016; the entire contents of which is incorporated herein by reference.

FIELD

Embodiments relate to an active material, a nonaqueous electrolyte battery, a battery pack, and a vehicle.

BACKGROUND

Recently, a nonaqueous electrolyte battery such as a lithium ion secondary battery has been actively researched and developed as a high energy-density battery. The nonaqueous electrolyte battery is anticipated as a power source for vehicles such as hybrid automobiles, electric cars, an uninterruptible power supply for base stations for portable telephone, or the like. Therefore, the nonaqueous electrolyte battery is demanded to, in addition to having a high energy density, be excellent in other performances such as rapid charge-discharge performances and long-term reliability, as well. For example, not only is the charging time remarkably shortened in a nonaqueous electrolyte battery capable of rapid charge and discharge, but the battery is also capable of improving motive performances in vehicles such as hybrid automobiles, and efficient recovery of regenerative energy of power.

In order to enable rapid charge-and-discharge, electrons and Li ions must be able to migrate rapidly between the positive electrode and the negative electrode. However, when a battery using a carbon-based negative electrode is repeatedly subjected to rapid charge-and-discharge, precipitation of dendrite of metallic lithium on the electrode may sometimes occur, raising concern of heat generation or fires due to internal short circuits.

In light of this, a battery using a metal composite oxide in a negative electrode in place of a carbonaceous material has been developed. In particular, in a battery using an oxide of titanium in the negative electrode, rapid charge-and-discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium as the negative electrode active material has a problem that the energy density is lower. In particular, when a material having a high potential relative to metallic lithium is used as a negative electrode material, the voltage becomes lower than that of a conventional battery using a carbonaceous material. Therefore, when such a material is used for systems requiring a high voltage such as an electric vehicle and a large-scale electric power storage system, there is a problem that the number of batteries connected in a series becomes large.

The potential of the electrode using an oxide of titanium is about 1.5 V (vs. Li/Li$^+$) relative to metallic lithium and is higher (more noble) than that of the negative electrode with carbonaceous material. The potential of an oxide of titanium arises from the redox reaction between $Ti^{3+}$ and $Ti^{4+}$ upon electrochemical insertion and extraction of lithium, and is therefore electrochemically limited. It has therefore been conventionally difficult to drop the potential of the electrode in order to improve the energy density.

BRIEF DESCRIPTION OF THE DRAWINGS

FIG. 1 is a graph showing charge-discharge curves of three composite oxides;

FIG. 3 is a schematic diagram showing a crystal structure of an example of a composite oxide having symmetry of a space group Fmmm;

FIG. 4 is a cross-sectional view of an example of a nonaqueous electrolyte battery according to a second embodiment;

FIG. 10 is a discharge curve of the nonaqueous electrolyte battery of Example 32;

FIG. 11 is a discharge curve of the battery pack of Example 33; and

FIG. 12 is a schematic diagram showing an example of an automobile including the battery pack according to the third embodiment.

DETAILED DESCRIPTION

Figure 2:
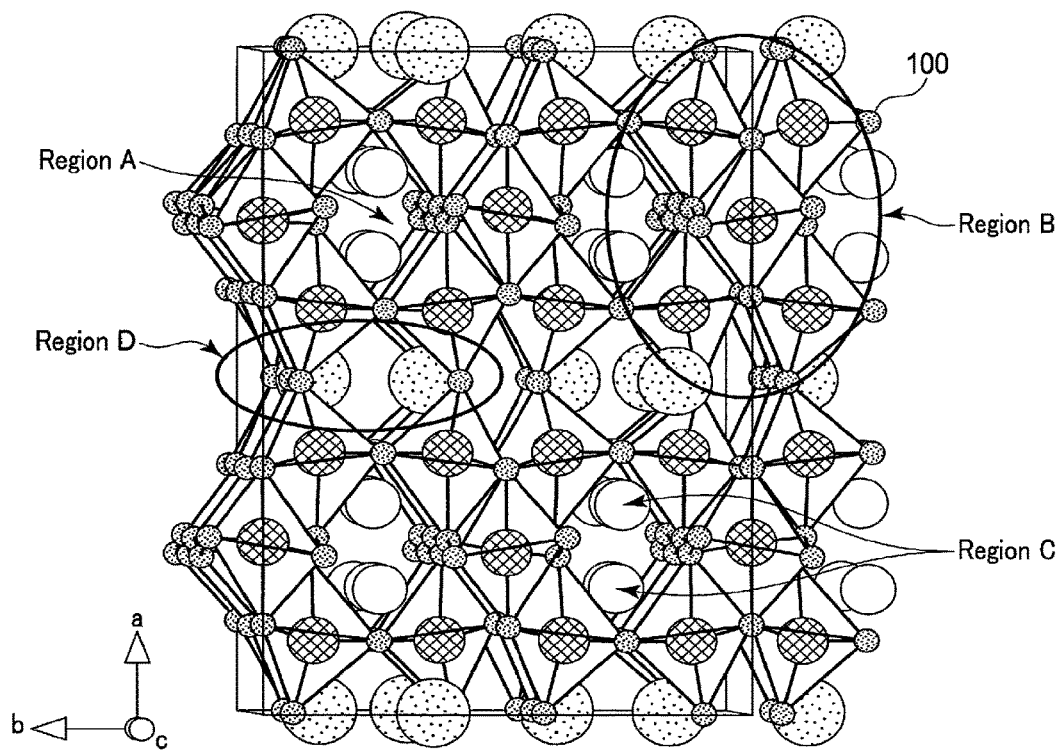
FIG. 2 is a schematic diagram showing a crystal structure of an example of a composite oxide having symmetry of a space group Cmca.

According to an aspect of a first embodiment, an active material is provided. The active material includes a composite oxide including yttrium atoms in an orthorhombic crystal structure thereof. Also included in the orthorhombic crystal structure of the composite oxide is at least one selected from the group consisting of alkali metal atoms and alkaline earth metal atoms. Among crystal sites represented by Wyckoff notations in the orthorhombic crystal structure, an occupancy of crystal sites that can be occupied by the alkali metal atoms or by the alkaline earth metal atoms is less than 100%.

According to another aspect of the first embodiment, an active material is provided. The active material has an orthorhombic crystal structure, and includes a composite oxide represented by a general formula $Li_{2+a}M1_{2-b}Ti_{6-c}Y_dM2_eO_{14+\delta}$. In the formula, M1 is at least one element selected from the group consisting of Sr, Ba, Ca, Mg, Na, Cs, Rb, and K; M2 is at least one element selected from the group consisting of Zr, Sn, V, Nb, Ta, Mo, W, Fe, Co, Cr, Mn, Ni, and Al; a is within a range of $0 \le a \le 6$; b is within a range of $0 \le b < 2$; c is within a range of $0 < c < 6$; d is within a range of $0 < d < 6$; e is within a range of $0 \le e < 6$; and δ is within a range of $-0.5 \le \delta \le 0.5$.

According to a second embodiment, a nonaqueous electrolyte battery is provided. The nonaqueous electrolyte battery includes a negative electrode, a positive electrode, and a nonaqueous electrolyte. The negative electrode includes the active material according to the first embodiment.

According to a third embodiment, a battery pack is provided. The battery pack includes the nonaqueous electrolyte battery according to the second embodiment.

According to a fourth embodiment, a vehicle is provided. The vehicle includes the battery pack according to the third embodiment.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration. In addition, similar effects can be achieved, even if the compositional elements include inevitable impurities accompanying industrial material or industrial process.

(First Embodiment)

According to a first embodiment, an active material is provided. In one aspect, the active material includes a composite oxide including yttrium atoms, and also including alkali metal atoms and/or alkaline earth metal atoms in an orthorhombic crystal structure thereof. Among the crystal sites represented by Wyckoff notations in the crystal structure, the occupancy of the crystal sites that alkali metal atoms occupy and/or the crystal sites that alkaline earth metal atoms occupy is less than 100%.

In one aspect, the composite oxide included in the active material according to the first embodiment has an orthorhombic crystal structure, and the crystal structure includes Y (yttrium) atoms and includes alkali metal atoms and/or alkaline earth metal atoms. The crystal sites occupied by these atoms in the crystal structure can be determined by measuring the crystal structure of the composite oxide using the later described powder X-Ray diffraction (XRD) and Rietveld analysis. The crystal sites determined by Rietveld analysis can be represented by the Wyckoff notations defined in, for example, the reference "International Tables for Crystallography, Volume A: Space-group symmetry, Second revised edition, edited by Theo Hahn, (International Union of Crystallography)".

In addition, as described below, the occupancy of the crystal sites occupied by the above-described atoms can be determined by Rietveld analysis. In the composite oxide according to this aspect, the occupancy of at least one of the crystal sites occupied by alkali metal atoms and/or alkaline earth metal atoms is less than 100%. In other words, the crystal structure of the composite oxide may include vacancies in at least one of the crystal sites which can be occupied by alkali metal atoms and the crystal sites which can be occupied by alkaline earth metal atoms.

In another aspect, the active material includes a composite oxide having an orthorhombic crystal structure. The composite oxide is represented by the general formula $Li_{2+a}M1_{2-b}Ti_{6-c}Y_dM2_eO_{14+\delta}$. In the formula, M1 is at least one element selected from the group consisting of Sr, Ba, Ca, Mg, Na, Cs, Rb, and K; M2 is at least one element selected from the group consisting of Zr, Sn, V, Nb, Ta, Mo, W, Fe, Co, Cr, Mn, Ni, and Al; a is within the range of $0 \leq a \leq 6$; b is within the range of $0 \leq b < 2$; c is within the range of $0 < c < 6$; d is within the range of $0 < d < 6$; e is within the range of $0 \leq e < 6$; $\delta$ is within the range of $-0.5 \leq \delta \leq 0.5$.

In addition, in either of the aspects, the active material may be a battery active material.

The composite oxide which may be included in the active material according to the first embodiment may be a substituted oxide obtained by substituting at least a part of the Ti (titanium) site with Y (yttrium) in the composite oxide having an orthorhombic crystal structure represented by the general formula $Li_xM1Ti_6O_{14+\delta}$.

The active material according to the first embodiment may have an average potential of Li insertion in the range of 0.5 V to 1.45 V (vs. Li/Li$^+$) with reference to the oxidation-reduction potential of Li. As a result of this, a nonaqueous electrolyte battery using the active material according to the first embodiment as the negative electrode can exhibit a higher battery voltage than a nonaqueous electrolyte battery using, for example, a titanium composite oxide having a Li insertion potential of 1.55 V (vs. Li/Li$^+$) as the negative electrode.

In addition, the active material according to the first embodiment can have much Li ions be inserted within the potential range of 1.0 V to 1.45 V (vs. Li/Li$^+$). With reference to FIG. 1, the reason explaining why the active material according to the first embodiment is able to have much Li ions be inserted within the potential range of 1.0 V to 1.45 V (vs. Li/Li$^+$), which is the oxidation-reduction potential of titanium, is described below.

FIG. 1 shows the charge-discharge curve of the composite oxide $Li_2SrTi_6O_{14}$ (charge curve 40 and discharge curve 41 represented by broken lines), the charge-discharge curve of the composite oxide $Li_2(Sr_{0.75}Na_{0.25})Ti_{5.75}Nb_{0.25}O_{14}$ (charge curve 50 and discharge curve 51 represented by thin lines), and the charge-discharge curve of $Li_2(Sr_{0.5}Na_{0.5})Ti_5(Y_{0.25}Nb_{0.75})O_{14}$ (charge curve 60 and discharge curve 61 represented by thick lines). The composite oxide $Li_2SrTi_6O_{14}$, whose potential change is represented by broken lines, is a composite oxide having an orthorhombic crystal structure represented by the general formula $Li_xM1Ti_6O_{14+\delta}$. On the other hand, the composite oxide $Li_2(Sr_{0.75}Na_{0.25})Ti_{5.75}Nb_{0.25}O_{14}$, whose potential change is represented by thin lines, is a composite oxide obtained by substituting the crystal structure of $Li_2SrTi_6O_{14}$ with Na at a part of the Sr site, and with Nb at a part of the Ti site. Furthermore, the composite oxide $Li_2(Sr_{0.5}Na_{0.5})Ti_5(Y_{0.25}Nb_{0.75})O_{14}$, whose potential change is represented by thick lines, is a composite oxide obtained by substituting the crystal structure of $Li_2SrTi_6O_{14}$ with Na at a part of Sr site, and with Y and Nb at a part of the Ti site. The composite oxide $Li_2(Sr_{0.5}Na_{0.5})Ti_5(Y_{0.25}Nb_{0.75})O_{14}$ represented by a thick line is an example of the composite oxide which may be included in the active material according to the first embodiment.

As shown in FIG. 1, the charge-discharge curve of the composite oxide $Li_2SrTi_6O_{14}$ has a flat potential section in the potential range of approximately 1.4 V to 1.45 V (vs. Li/Li$^+$). However, when the potential falls below 1.4 V (vs. Li/Li$^+$), the potential rapidly decreases. More specifically, the charge-discharge curve of the composite oxide $Li_2SrTi_6O_{14}$ includes a portion of stair-stepping potential. In a nonaqueous electrolyte battery made using the composite oxide exhibiting such potential change in the negative electrode, an abrupt voltage change occurs when the SOC is of a low value, and thus effective capacity decreases. In addition, as shown in FIG. 1, the charge-discharge curve of the composite oxide $Li_2(Sr_{0.75}Na_{0.25})Ti_{5.75}Nb_{0.25}O_{14}$ can exhibit smooth and moderate potential change within the potential range of approximately 1.0 V to 1.45 V (vs. Li/Li$^+$), but the average operating potential relative to the metal Li potential is 1.42 V (vs. Li/Li$^+$) in the state of being charged to half the full discharge capacity (SOC=50%).

On the other hand, as shown in FIG. 1, not only does the charge-discharge curve of the composite oxide Li$_2$(Sr$_{0.5}$Na$_{0.5}$)Ti$_5$(Y$_{0.25}$Nb$_{0.75}$)O$_{14}$ exhibit a smooth and moderate potential change within the potential range of approximately 1.0 V to 1.40 V (vs. Li/Li$^+$), but for the composite oxide Li$_2$(Sr$_{0.5}$Na$_{0.5}$)Ti$_5$(Y$_{0.25}$Nb$_{0.75}$)O$_{14}$, the average operating potential with reference to the metal Li potential in the state of being charged to half the full discharge capacity (SOC=50%) is the lowest at 1.39 V (vs. Li/Li$^+$), and further, the charge-discharge capacity is the highest. A nonaqueous electrolyte battery produced using the composite oxide in the negative electrode can provide a battery which exhibits a high voltage, and has a high energy density.

The reason that the composite oxide, which may be included in the active material according to the first embodiment, has a low average operating potential relative to Li potential in the potential range of 1.0 V to 1.45 V (vs. Li/Li$^+$) and thus can have a high charge-discharge capacity can be considered to be due to the Ti site being substituted with Y. The reason is explained below.

The composite oxide which may be included in the active material according to the first embodiment is represented by, for example, the general formula Li$_{2+a}$M1$_{2-b}$Ti$_{6-c}$Y$_d$M2$_e$O$_{14+\delta}$. In this titanium-including composite oxide, Li exists as an element having a monovalent positive charge. M1 is at least one element selected from the group consisting of Sr, Ba, Ca, Mg, Na, Cs, Rb, and K. M2 is at least one element selected from the group consisting of Zr, Sn, V, Nb, Ta, Mo, W, Fe, Co, Cr, Mn, Ni, and Al. M2 is more preferably at least one element selected from the group consisting of Al, Fe, Zr, Sn, V, Nb, Ta, and Mo. Each of the elements M1 and M2 may be used alone, or in combination of plural elements. The valence of the compositional elements is the valence of each compositional element in a state where a is 0 in the preceding general formula, i.e., in a discharged state.

In this composite oxide, the total valence of the positively charged compositional elements coincide with the total valence of negatively charged oxide ions, and maintains charge neutrality. Specifically, in the composite oxide, the total of the valence of Li ions is 2+a. The total of the valence of M1 is $(x_1 \times 1)+(x_2 \times 2)$ (wherein $x_1+x_2=2-b$), under the assumption that 1 mol of the composite oxide includes $x_1$ mol of monovalent element M1 and $x_2$ mol of divalent element M1. Among the above-described elements M1, the alkali metal elements Na, Cs, Rb, and K are monovalent elements, and the alkaline earth elements Sr, Ba, Ca, and Mg are divalent elements.

Furthermore, the total valence of Ti ions is 4×(6−c), and the total valence of yttrium ions is 3×d. The total of the valence of M2 is $(x_3 \times 3)+(x_4 \times 4)+(x_5 \times 5)+(x_6 \times 6)$ (wherein $x_3+x_4+x_5+x_6=e$), under the assumption that 1 mol of the composite oxide includes $x_3$ mol of trivalent element M2, $x_4$ mol of tetravalent element M2, $x_5$ mol of pentavalent element M2, and $x_6$ mol of hexavalent element M2. Among the elements M2 described above, Al and Fe are trivalent elements, Zr and Sn are tetravalent elements, V, Nb, and Ta are pentavalent elements, and Mo is a hexavalent element. Nb, W, Fe, Co, Cr, Mn, and Ni are transition metal elements, and thus the valence varies depending on conditions.

The total valence of the positively charged compositional elements coincides with the total valence of the negatively charged oxide ions: $(-2) \times (14+\delta)$. The subscript δ of the oxide ion can represents a value of −0.5 to 0.5. Accordingly, similar effects can be achieved even if the total valence of the positively charged compositional elements shown herein varies within the range of ±1 with reference to the valence −28, which is the total valence of the oxide ions. If the δ is outside the range of −0.5≤δ≤0.5, the oxidation-reduction state of the positively charged compositional elements is not in the stable state, or lattice defects such as oxygen deficiency may occur. The use of an active material including a composite oxide in such state is not preferred, because the battery performance can deteriorate.

Supposing that the positively charged elements composing the composite oxide are in a stable oxidized state, and the oxide ions exist in proper quantity, since δ=0 in such a case, the total valence of oxide ions would thus be −2×14=−28. In this case, the agreement between the total valence of the positively charged elements and the total valence of the negatively charged oxide ions is represented by the following formula (1):

$$(2+a)+\{(x_1 \times 1)+(x_2 \times 2)\}+\{4 \times (6-c)\}+(3 \times d)+\{(x_3 \times 3)+(x_4 \times 4)+(x_5 \times 5)+(x_6 \times 6)\}-28=0 \quad (1)$$

The formula (1) can be organized to obtain the following formula (2):

$$a-4c+3d+(x_1+2x_2+3x_3+4x_4+5x_5+6x_6)=2 \quad (2)$$

When the conditions of the formula (2) are satisfied, charge neutrality in the crystal structure of the composite oxide is maintained. When charge neutrality is maintained in the composite oxide, the composite oxide may correspond to a substituted oxide based on the composite oxide represented by the general formula Li$_x$M1Ti$_6$O$_{14+\delta}$, within the crystal structure of which, at least one element selected from the group consisting of Sr, Ba, Ca, Mg, Na, Cs, Rb, and K is correctly positioned in the M1 site, and a part of the Ti site is correctly substituted with yttrium. In addition, at least one element selected from the group consisting of Zr, Sn, V, Nb, Ta, Mo, W, Fe, Co, Cr, Mn, Ni, and Al may be correctly positioned in the crystal structure of the composite oxide. By including the substituted oxide wherein at least a part of the Ti sites is correctly substituted with yttrium in the crystal structure of the composite oxide represented by the general formula Li$_x$M1Ti$_6$O$_{14+\delta}$, the coordination environment of oxide ions relative to the vacancy sites of the crystal structure, into which Li ions are inserted, can be made uniform in the active material according to the first embodiment. Furthermore, an electrostatic force of attraction applied to the electrons occupying the d band is small in the titanium composite oxide including yttrium, which is the transition metal having the smallest effective nuclear charge, in the crystal structure thereof. Accordingly, the Fermi level can be increased. As a result of this, the electrode potential relative to Li (vs. Li/Li$^+$) decreases.

From the above reason, in the potential range of 1.0 V to 1.45 V (vs. Li/Li$^+$), the average operating potential of the composite oxide which may be included in the active material according to the first embodiment with reference to the Li potential can be lowered. In addition, the inclusion of yttrium, which is a transition element having a small effective nuclear charge, weakens the coordinate bonds of oxide ions. Accordingly, flexibility of the crystal lattice at the time of insertion of Li ions into the composite oxide is increased. As a result of this, the charge-discharge capacity increases.

In addition, the active material according to the first embodiment can provide a nonaqueous electrolyte battery which exhibits a high reversible capacity during charge and discharge, and marked life performance, by virtue of including a substituted oxide wherein at least a part of the Ti sites is correctly substituted with Y, and M1 and M2 are correctly located in the crystal structure of the composite oxide represented by the general formula $Li_xM1Ti_6O_{14+\delta}$.

As a result, the active material according to the first embodiment can realize a nonaqueous electrolyte battery which exhibits a high energy density and a high battery voltage, and has marked life performance.

In the general formula $Li_{2+a}M1_{2-b}Ti_{6-c}Y_dM2_eO_{14+\delta}$, the subscript a can change within the range of $0 \leq a \leq 6$ depending on the state of charge of the composite oxide represented by this general formula. For example, according to the production method which will be described later, for example, there can be produced a composite oxide wherein the subscript a is 0 in the above-described general formula. When the composite oxide wherein the subscript a is 0 is incorporated in a nonaqueous electrolyte battery as the negative electrode active material, and the nonaqueous electrolyte battery is charged, the value a is increased to the value within the range of more than 0 and 6 or less. Alternatively, for example, according to the method which will be described later, the composite oxide may be synthesized using a raw material composition ratio wherein the value of the subscript a would be more than 0 and 6 or less before the initial charge. When the active material includes a composite oxide wherein the value of the subscript a is more than 0 and 6 or less before the initial charge, trapping of the lithium ions in the structure of the active material during the initial charge and discharge is suppressed. As a result of this, the initial charge-discharge efficiency can be improved.

In addition, the subscript 2−b represents the proportion of the element M1 that occupy the M1 sites in the crystal structure of the composite oxide represented by the general formula $Li_{2+a}M1_{2-b}Ti_{6-c}Y_dM2_eO_{14+\delta}$. The subscript b is within the range of $0 \leq b < 2$, preferably within the range of $0.1 \leq b \leq 1.0$, and more preferably within the range of $0.5 \leq b \leq 0.75$.

As described above, the element M1 includes alkali metal elements and alkaline earth metal elements. In other words, the M1 site can be described as representing the crystal sites which can be occupied by alkali metal atoms and alkaline earth metal atoms in the crystal structure of the composite oxide. In addition, as will be described below in detail, in the case that the occupancy of such crystal sites is less than 100%, it would mean that vacancies are present in a part of the M1 sites in the crystal structure.

The subscript 6−c represents the proportion of Ti that occupy sites within the crystal structure of the composite oxide represented by the general formula $Li_{2+a}M1_{2-b}Ti_{6-c}Y_dM2_eO_{14+\delta}$. The subscript c is within the range of $0 < c < 6$, preferably within the range of $0.1 \leq c \leq 2.0$, and more preferably within the range of $0.5 \leq c \leq 1.0$.

The subscript d represents the proportion of Y that occupy the Ti sites in the crystal structure of the composite oxide represented by the general formula $Li_{2+a}M1_{2-b}Ti_{6-c}Y_dM2_eO_{14+\delta}$. The subscript d is within the range of $0 < d < 6$, preferably within the range of $0.01 \leq d \leq 0.5$, and more preferably within the range of $0.1 \leq d \leq 0.25$.

In addition, the subscript e represents the proportion of M2 that occupy the Ti sites in the crystal structure of the composite oxide represented by the general formula $Li_{2+a}M1_{2-b}Ti_{6-c}Y_dM2_eO_{14+\delta}$. The subscript e is within the range of $0 \leq e < 6$, preferably within the range of $0 \leq e \leq 1.0$, and more preferably within the range of $0.25 \leq e \leq 0.75$.

Accordingly, the total of (6−c), d, and e, which are respectively the occupancies of Ti, Y, and M2 in the Ti site, is (6−c)+d+e=6, which can be organized into d+e−c=0.

In addition, in the general formula $Li_{2+a}M1_{2-b}Ti_{6-c}Y_dM2_eO_{14+\delta}$, the subscript $\delta$ can change within the range of $-0.5 \leq \delta \leq 0.5$ depending on the oxygen deficiency in the composite oxide represented by this general formula, and the amount of oxygen inevitably included during the production process of the active material. As described above, when the change of the subscript $\delta$ is within this range, performance preferred for a battery active material will be achieved.

In this manner, the subscripts a, b, c, d, e, and $\delta$ can respectively be of values within specific ranges; however, as described above, the total valence of the positively charged elements and the total valence of the negatively charged oxide ions are equal in the titanium-including composite oxide represented by the general formula $Li_{2+a}M1_{2-b}Ti_{6-c}Y_dM2_eO_{14+\delta}$.

In one preferred aspect, the composite oxide included in the active material according to the first embodiment is represented by the general formula $Li_{2+a}Sr_{2-b}Na_{b-1}Ti_{6-c}Y_dNb_eO_{14+\delta}$. In the formula, a is within the range of $0 \leq a \leq 6$, b is within the range of $1 \leq b < 2$, c is within the range of $0 < c < 6$, d is within the range of $0 < d < 6$, e is within the range of $0 < e < 6$, and $\delta$ is within the range of $-0.5 \leq \delta \leq 0.5$. The composite oxide represented by this general formula may, for example, correspond to a composite oxide which is obtained by substituting in an orthorhombic crystal structure of the composite oxide represented by the general formula $Li_{2+a}SrTi_6O_{14}$, a part of the Sr sites with Na and a part of the Ti sites with Y and Nb.

In the orthorhombic crystal structure of the composite oxide represented by the general formula $Li_{2+a}SrTi_6O_{14}$, when a part of the Ti site is substituted with Nb, the Fermi level decreases. On the other hand, when the Ti site is substituted with Y, the decrease of the Fermi level caused by substitution with Nb can be suppressed. On the other hand, monovalent reduction of Ti from tetravalent to trivalent is possible, while divalent reduction of Nb from pentavalent to trivalent is possible. Therefore, substitution of at least a part of Ti with Nb increases the amount of Li that can be inserted into the composite oxide. More specifically, the effect of substitution with Na and Y decreases the Li insertion potential, and Nb increases the amount of Li that can be inserted. Therefore, the use of the active material including the composite oxide as a battery active material allows obtaining of a battery having a high battery voltage and a large capacity, i.e., a battery having high energy density.

In another preferred aspect, in the composite oxide included in the active material according to the first embodiment, the above-described composite oxide is represented by the general formula $Li_{2+a}Na_{2-b}Ti_{6-c}Y_dNb_eO_{14+\delta}$. In the formula, a is within the range of $0 \leq a \leq 6$, b is within the range of $0 < b < 2$, c is within the range of $0 < c < 6$, d is within the range of $0 < d < 6$, e is within the range of $0 < e < 6$, and $\delta$ is within the range of $-0.5 \leq \delta \leq 0.5$. The composite oxide represented by this general formula may correspond to a composite oxide which is obtained by substituting in an orthorhombic crystal structure of the composite oxide represented by the general formula $Li_{2+a}Na_2Ti_6O_{14}$, a part of the Ti sites with Y and Nb, while voids are introduced to a part of the Na sites.

In the orthorhombic crystal structure of the composite oxide represented by the general formula $Li_{2+a}Na_2Ti_6O_{14}$, if a part of the Ti sites is substituted with Nb, the Fermi level decreases. On the other hand, substitution of a part of the Ti sites with Y suppresses the decrease of the Fermi level caused by substitution with Nb. On the other hand, the introduction of vacancies in a part of the Na sites increases the Li insertion sites within the composite oxide. Furthermore, as described above, divalent reduction of Nb from pentavalent to trivalent is possible, and thus the substitution of at least a part of Ti with Nb increases the amount of lithium that can be inserted into the composite oxide. More specifically, the effect of substituting with Y decreases the lithium insertion potential, and the introduction of vacancies and Nb substitution in the Na sites increases the amount of lithium that can be inserted. Therefore, the use of the active material including the composite oxide as a battery active material increases the battery voltage and battery capacity, and thus allows obtaining of a battery having a high energy density.

In the X-ray diffraction pattern of the composite oxide represented by the general formula $Li_{2+a}M1_{2-b}Ti_{6-c}Y_dM2_eO_{14+\delta}$ obtained by powder X-Ray diffraction using Cu-Kα rays, the intensity ratio $I_L/I_H$ is preferably within the range of $0.6 \leq I_L/I_H \leq 3.15$, wherein $I_L$ is the intensity of the diffraction peak having the highest intensity among diffraction peaks appearing in the range of $17° \leq 2\theta \leq 18.5°$, and $I_H$ is the intensity of the diffraction peak having the highest intensity among diffraction peaks appearing in the range of $18.5° \leq 2\theta \leq 19.5°$.

The composite oxide as an example of the preferred aspect may be a compound having an orthorhombic crystal structure belonging to, for example, the space group Cmca, and where the intensity ratio $I_{L1}/I_{H1}$ in an X-ray diffraction pattern thereof, as obtained by powder X-Ray diffraction using Cu-Kα rays, is within the range of $0.6 \leq I_{L1}/I_{H1} \leq 3.15$, wherein $I_{L1}$ is the intensity of the diffraction peak having a higher intensity between the diffraction peaks corresponding to the planes (112) and (021), and $I_{H1}$ is the intensity of the diffraction peak corresponding to the (220) plane.

FIG. 2 shows a crystal structure of $Li_2(Sr_{0.8}Na_{0.2})Ti_5Y_{0.4}Nb_{0.6}O_{14}$, which is an example of the composite oxide having a symmetry of the space group Cmca.

In the crystal structure shown in FIG. 2, the position represented by the smallest spheres 100 at the apex of the polyhedral shows the position of oxide ions.

In addition, in the crystal structure shown in FIG. 2, the region A shows a vacancy site having a channel through which Li ions can move three-dimensionally within the crystal structure, and Li ions can be inserted and extracted via the region A. The region B has a polyhedral structure of an oxide centered about Ti, Y, or Nb which serve as the framework of the crystal structure. On the other hand, the region C is a site at which exist Li ions which can be inserted and extracted. The region D is a site at which exist Sr, Na, and Li, which function as framework for stabilizing the crystal structure.

In the X-ray diffraction pattern obtained by measuring a composite oxide like this example using Cu-Kα rays by powder X-Ray diffraction, the intensity ratio $I_{L1}/I_{H1}$ may fall within the range of $0.6 \leq I_{L1}/I_{H1} \leq 3$, wherein $I_{L1}$ is the intensity of the diffraction peak having a higher intensity between the diffraction peak appearing in the range of $17.8° \leq 2\theta \leq 18.5°$, which corresponds to the (112) plane, and the diffraction peak appearing in the range of $17° \leq 2\theta \leq 17.8°$, which corresponds to the (021) plane, and $I_{H1}$ is the intensity of the diffraction peak appearing in the range of $18.6° \leq 2\theta \leq 19.5°$, which corresponds to the (220) plane.

In addition, another example of the composite oxide according to preferred aspect, which has the intensity ratio $I_L/I_H$ within the range of $0.6 \leq I_L/I_H \leq 3.15$ in the X-ray diffraction pattern obtained by powder X-ray diffraction on the composite oxide, may be a compound having an orthorhombic crystal structure belonging to the space group Fmmm, and where the intensity ratio $I_{L2}/I_{H2}$ in the X-ray diffraction pattern, as obtained by powder X-Ray diffraction using Cu-Kα rays, is within the range of $0.6 \leq I_{L2}/I_{H2} \leq 3$, wherein $I_{L2}$ is the intensity of the diffraction peak corresponding to the (111) plane, and $I_{H2}$ is the intensity of the diffraction peak corresponding to the (202) plane.

FIG. 3 shows the crystal structure of $Li_2Na_{1.5}Ti_5Y_{0.25}Nb_{0.75}O_{14}$, which is an example of the composite oxide having a symmetry of the space group Fmmm.

In the crystal structure shown in FIG. 3, the smallest spheres 100 show the locations of the oxide ions.

In addition, in the crystal structure shown in FIG. 3, the region A shows a vacancy site having a channel through which Li ions can move three-dimensionally within the crystal structure, and Li ions can be inserted and extracted via the region A. The region B has a polyhedral structure of an oxide centered about Ti, Y, or Nb, which serve as the framework of the crystal structure. On the other hand, the region C is a site at which exist Li ions which can be inserted and extracted. The region D is a site at which exist Sr, Na, and Li, which function as framework for stabilizing the crystal structure.

In the X-ray diffraction pattern obtained by measuring a composite oxide like this example using Cu-Kα rays by powder X-Ray diffraction, the intensity ratio $I_{L2}/I_{H2}$ may be within the range of $0.6 \leq I_{L2}/I_{H2} \leq 3$, wherein $I_{L2}$ is the intensity of the diffraction line appearing in the range of $17.8° \leq 2\theta \leq 18.5°$, which corresponds to the (111) plane, and $I_{H2}$ is the intensity of the diffraction line appearing in the range of $18.6° \leq 2\theta \leq 19.5°$, which corresponds to the (202) plane.

In the composite oxide such as the examples shown in FIGS. 2 and 3, not only has the crystallites grown in a direction suitable for insertion and extraction of Li ions, but insertion of Li ions into vacancy sites having different coordination environments of oxide ions can be suppressed. As a result of this, in the active material including the composite oxide of this example, reversibility of the Li ions during charge and discharge improves, which brings about preferred results such as the increase of the effective capacity and the improvement of life performance of the nonaqueous electrolyte battery.

The active material according to the first embodiment may include a composite oxide having a crystal structure where crystal phases having symmetries of Cmca and Fmmm are mixed, or a composite oxide having a crystal structure similar to symmetry of Cmca or Fmmm. In either case, the achieved effect is similar to that achieved by the active material of the embodiment including the composite oxide having the symmetry of the space group Cmca or the composite oxide having the symmetry of the space group Fmmm. Specific examples of the symmetry similar to the symmetry of Cmca or Fmmm include Pmcm, Pmma, and Cmma. In the composite oxide having the crystal structure with any of these symmetries, irrespective of the crystal plane index, the intensity ratio $I_L/I_H$ is preferably within the range of $0.6 \leq I_L/I_H \leq 3$, wherein $I_L$ is the intensity of the diffraction peak having the highest intensity among diffraction peaks appearing in the range of $17° \leq 2\theta \leq 18.5°$, and $I_H$ is the intensity of the diffraction peak having the highest intensity among the diffraction peaks appearing in the range of $18.6° \leq 2\theta \leq 19.5°$. In this case, reversibility of Li ions during charge and discharge improves, which results in the increase of the effective capacity and improvement of life performance of the nonaqueous electrolyte battery.

The composite oxide included in the active material according to the first embodiment may be in a particulate form, for example. The average particle size of the composite oxide included in the active material of the first embodiment is not particularly limited, and can be changed according to desired battery performance.

The active material according to the first embodiment preferably includes the above composite oxide particles and a conductive substance such as carbon coating at least a part of the surface thereof. The active material of such a preferable aspect can exhibit improved rapid charge-discharge performance. Since the insertion and extraction of Li occur through a homogeneous solid-state reaction in the composite oxide, the composite oxide has a property where electrical conductivity increases in accordance with increasing amount of Li inserted. In such a composite oxide, electrical conductivity becomes relatively low in a region with a low amount of inserted Li. Therefore, by coating the surface of composite oxide particles in advance with a conductive substance such as carbon, a high rapid charge-discharge performance can be obtained, regardless of the inserted amount of Li.

Alternatively, by coating at least a part of the surface of the composite oxide particles with lithium titanate, which exhibit electrical conductivity in accordance with insertion of Li, in place of the conductive substance such as carbon, the same effect can be obtained. In addition, lithium is extracted from lithium titanate coating at least a part of the surface of the composite oxide particles, when the battery is internally short-circuited, and the lithium titanate becomes insulating. Therefore, excellent safety can be achieved.

<BET Specific Surface Area>

The BET specific surface area of the composite oxide included in the active material according to the first embodiment is not particularly limited, and is preferably 5 m$^2$/g or more and less than 200 m$^2$/g. The BET specific surface area is more preferably 5 m$^2$/g to 30 m$^2$/g.

When the BET specific surface area is 5 m$^2$/g or more, the contact area with the nonaqueous electrolyte can be secured. Thus, good discharge rate performances can be easily obtained and also, a charge time can be shortened. On the other hand, when the BET specific surface area is less than 200 m$^2$/g, reactivity with the nonaqueous electrolyte can be prevented from being too high and therefore, the life performance can be improved. When the BET specific surface area is 30 m$^2$/g or less, side reactions with the nonaqueous electrolyte can be suppressed, and thereby longer life can be further expected. Furthermore, in this case, a coatability of a slurry including the active material used in the production of an electrode, which will be described later, can be improved.

Here, as the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most frequently used method is a BET method based on the low temperature/low humidity physical adsorption of an inert gas. This BET method is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Method>

The composite oxide including the active material according to the first embodiment can be synthesized, for example, by a solid phase reaction as described below.

First, raw materials, such as an oxide, a compound, and a salt, are mixed in an appropriate stoichiometric ratio to obtain a mixture. The above salt is preferably a salt such as a carbonate or nitrate, which decomposes at a relatively low temperature to form an oxide. Next, the obtained mixture is ground and mixed as uniformly as possible. Subsequently, the resulting mixture is pre-calcined. The pre-calcination is performed at a temperature range of 600° C. to 850° C. in air for a total of 1 to 3 hours.

Then, the calcination temperature is increased and main-calcination is performed at 900° C. to 1500° C. in air.

At this time, lithium, which is a light element, may be vaporized due to calcining at a temperature of 900° C. or higher. In such a case, a sample having a correct composition can be obtained by, for example, compensating for the amount of lithium that becomes vaporized, as follows. For example, the vaporized amount of lithium in the calcination conditions may be investigated, and the vaporized amount that has been found be compensated for by providing a raw material including lithium in an excess amount. Alternatively, a mixture having the same composition as the pre-calcined raw material mixture may be prepared, and the pre-calcined product may be covered with the mixture. The pre-calcined product is subjected to main-calcination while being covered with the raw material mixture, whereby the raw material mixture forms an outer shell, and vaporization of lithium from the pre-calcined product can be prevented. After the calcination, the outer shell is removed.

Furthermore, it is more preferable to prevent lattice defects caused by oxygen deficiency or the like. For example, the raw material powder may be pressure-molded into pellets or rods before main-calcination, whereby the area exposed to atmosphere is decreased, and the contact area between the particles is increased. Generation of lattice defects can be suppressed by calcining in this manner. In the case of industrial mass production, it is preferred that oxygen deficiency be repaired by calcining the raw material powder under high oxygen partial pressure such as oxygen atmosphere, or by heat treatment (annealing) in the temperature range of 400 to 1000° C. after standard calcination in the air. On the other hand, oxygen deficiency may be intentionally left, thereby changing the oxidation number of titanium included in the composite oxide to increase electron conductivity. However, if generation of lattice defects is not prevented, the crystallinity decreases, and thus the battery performance may decrease when the composite oxide is used as an electron active material. In order to prevent this, it is more preferable to follow the annealing treatment with quenching, for example, by rapidly cooling to the temperature of liquid nitrogen.

When the composite oxide synthesized as described above has symmetry corresponding to, for example, the space group Cmca, in the X-ray diffraction pattern obtained by powder X-Ray diffraction using Cu-Kα rays, the intensity ratio $I_{L1}/I_{H1}$ would be within the range of $0.6 \leq I_{L1}/I_{H1} \leq 3$, wherein $I_{L1}$ is the intensity of the diffraction peak having a higher intensity between the diffraction peak appearing in the range of $17.8° \leq 2\theta \leq 18.5°$, which corresponds to the (112) plane, and the diffraction peak appearing in the range of $17° \leq 2\theta \leq 17.8°$, which corresponds to the (021) plane, and $I_{H1}$ is the intensity of the diffraction peak appearing in the range of $18.6° \leq 2\theta \leq 19.5°$, which corresponds to the (220) plane.

In addition, when the composite oxide synthesized as described above has symmetry corresponding to, for example, the space group Fmmm, in the X-ray diffraction pattern obtained by powder X-Ray diffraction using Cu-Kα rays, the intensity ratio $I_{L2}/I_{H2}$ would be within the range of $0.6 \leq I_{L2}/I_{H2} \leq 3$, wherein $I_{L2}$ is the intensity of the diffraction peak appearing in the range of $17.8° \leq 2\theta \leq 18.5°$, which corresponds to the (111) plane, and $I_{H2}$ is the intensity of the diffraction peak appearing in the range of $18.6° \leq 2\theta \leq 19.5°$, which corresponds to the (202) plane.

As a result of the above-described synthesis, as explained above, a composite oxide represented by the above-described general formula wherein the subscript a is 0 is produced, for example. When the composite oxide having the subscript a of 0 is incorporated into a nonaqueous electrolyte battery as a negative electrode active material, and the nonaqueous electrolyte battery is charged, the value of a is increased to a value within the range of more than 0 and 6 or less. Alternatively, a composite oxide wherein the value of a is within the range of more than 0 and 6 or less can be synthesized by using a lithium source such as lithium carbonate as a raw material, and synthesizing a composite oxide at a raw material composition ratio such that the value of a would be within the range of more than 0 and 6 or less. Alternatively, a composite oxide wherein the value of a is within the range of more than 0 and 6 or less can be obtained by immersing the composite oxide after synthesis in, for example, a lithium hydroxide aqueous solution.

<Method of Measuring Composite Oxide>

Next, a method for obtaining the X-ray diffraction diagram of the composite oxide according to the powder X-ray diffraction, and a method for examining the composition of the composite oxide will be described. A method of measuring the amount of carbon in the composite oxide will also be explained.

When a target active material to be measured is included in an electrode material of a nonaqueous electrolyte battery, a pre-treatment is performed as described below.

First, a state close to the state in which Li ions are completely extracted from a crystal of the active material is achieved. For example, when the target active material to be measured is included in a negative electrode, the battery is brought into a completely discharged state. A battery can be discharged in a 25° C. environment with a 0.1 C current to a rated end voltage, whereby the discharged state of the battery can be achieved. Although a slight amount of residual Li ions may exist even in the discharged state, this does not significantly affect results of powder X-ray diffraction measurement described below.

Next, the battery is disassembled in a glove box filled with argon, and the electrode is taken out. The taken-out electrode is washed with an appropriate solvent and dried under a reduced pressure. For example, ethyl methyl carbonate may be used for washing. After washing and drying, whether or not there are white precipitates such as a lithium salt on the surface is examined.

The washed electrode is processed or treated as appropriate, depending on the measurement method to be subjected to. For example, in the case of subjecting to the powder X-ray diffraction measurement, the washed electrode is cut into a size having the same area as that of a holder of the powder X-ray diffraction apparatus, and used as a measurement sample.

When necessary, the active material is extracted from the electrode to be used as a measurement sample. For example, in the case of subjecting to a composition analysis, or in the case of measuring the amount of included carbon, the active material is taken out from the washed electrode, and the taken out active material is analyzed, as described later.

<Method for Obtaining X-Ray Diffraction Diagram of Composite Oxide According to Powder X-Ray Diffraction>

The crystal structure of the active material can be examined by powder X-Ray Diffraction (XRD).

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar in order to grind apart aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate, for example. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder. Next, the glass plate filled with the sample is set in a powder X-ray diffractometer. And then, a diffraction pattern (XRD pattern; X-Ray Diffraction pattern) is obtained using Cu-Kα rays.

When the target active material to be measured is included in the electrode material of a nonaqueous electrolyte battery, first, the electrode is taken out from the nonaqueous electrolyte battery according to the previously described procedure. The obtained measurement sample is affixed directly to the glass holder, and measured. In this case, the position of the peak originated from the electrode substrate such as a metal foil is measured in advance. The peaks of other components such as a conductive agent and a binder are also measured in advance. In such a case that the peaks of the substrate and active material overlap with each other, it is desirable that the layer including the active material (e.g., the later-described electrode layer) is separated from the substrate, and subjected to measurement. This is in order to separate the overlapping peaks when quantitatively measuring the peak intensity. For example, the electrode layer can be separated by irradiating the electrode substrate with an ultrasonic wave in a solvent.

In the case where there is high degree of orientation in the sample, there is the possibility of deviation of peak position and variation in an intensity ratio, depending on how the sample is filled. For example, in some cases, an orientation in which crystal planes are arranged in a specific direction may be observed from the results of the Rietveld analysis, depending on the shapes of particles. Alternatively, in some cases, influence due to orientation can be seen from measuring of the measurement sample obtained by taking out from the nonaqueous electrolyte battery. Such a sample having high orientation is measured using a capillary (cylindrical glass narrow tube). Specifically, the sample is inserted into the capillary, which is then mounted on a rotary sample table and measured while being rotated. Such a measuring method can provide the result with the influence of orientation reduced.

As an apparatus for powder X-ray diffraction measurement, SmartLab manufactured by Rigaku is used, for example. Measurement is performed under the following condition:

X-ray source: Cu target
Output: 45 kV, 200 mA
soller slit: 5 degrees in both incident light and received light step width (2θ): 0.02 deg
scan speed: 20 deg/min
semiconductor detector: D/teX Ultra 250
sample plate holder: flat glass sample plate holder (0.5 mm thick)
measurement range: range within $5° \leq 2\theta \leq 90°$ When another apparatus is used, in order to obtain measurement results equivalent to those described above, measurement using a standard Si powder for powder X-ray diffraction is performed, and measurement is conducted with conditions adjusted such that a peak intensity and a peak top position correspond to those obtained using the above apparatus.

Conditions of the above powder X-ray diffraction measurement is set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. The parameters of the crystal structure (lattice constant, atomic coordinate, crystal site occupancy, or the like) can be precisely analyzed by fitting all the calculated values with the measured values. Thereby, the characteristics of the crystal structure of the synthesized composite oxide can be determined.

Furthermore, the site occupancy of compositional elements in each of the sites can be determined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation σj must be taken into consideration. The fitting parameter S and standard deviation σj defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

This method can also determine the vacancy amount in the target composite oxide. Specifically, the atom occupancy in the crystal structural model can be refined by Rietveld analysis. From this result, the presence or absence of the formation of vacancies in the crystal structure of the composite oxide can be examined. Specifically, that the value of the atom occupancy obtained as a result of refinement is below 100% indicates that the sites which should be occupied are not occupied by the atoms. In other words, the occupancy is 100% when no vacancy is formed in the target site, and the occupancy is less than 100% when a vacancy is formed in the site. Thus, the presence or absence of the formation of vacancy can be examined by Rietveld analysis.

Using the above-described method, information on the crystal structure of the active material to be measured can be obtained. For example, when the active material according to the first embodiment is measured as described above, the measured active material would be found to include a composite oxide having an orthorhombic structure. In addition, the above-described measurement also allows examination of the symmetry of the crystal structure in the measurement sample, such as the space groups Cmca and Fmmm.

On the other hand, in order to determine the previously described intensities $I_L$ and $I_H$ ($I_{L1}$ and $I_{H1}$ or $I_{L2}$ and $I_{H2}$) of diffraction peaks for the composite oxide, the powder X-ray diffraction results measured under the above conditions without any processing, i.e., raw data is used. In the X-ray diffraction diagram, the peak top, i.e., the maximum intensity of a strongest diffraction peak appearing within the range of $17.0° \leq 2\theta \leq 18.5°$ is defined as $I_L$. On the other hand, the peak top; i.e., the maximum intensity of a strongest diffraction peak appearing within the range of $18.6° \leq 2\theta \leq 19.5°$ is defined as $I_H$. An intensity ratio $I_L/I_H$ can be calculated by dividing the intensity numerical value (counts per second: cps) of the intensity $I_L$ by the intensity numerical value (cps) of the intensity $I_H$.

<Method for Examining Composition of Composite Oxide>

The composition within the active material can be analyzed using Inductively Coupled Plasma (ICP) emission spectrometry, for example. In this case, the abundance ratios of elements depend on the sensitivity of an analyzing device to be used. Therefore, when the composition of an example of the active material according to the first embodiment is analyzed using ICP emission spectrometry, for example, the numerical values may deviate due to errors of the measuring device from the previously described element ratios. However, even if the measurement results deviate as described above within the error range of the analyzing device, the example of the active material according to the first embodiment can sufficiently exhibit the previously described effects.

In order to measure the composition of the active material assembled into a battery according to ICP emission spectrometry, the following procedure is specifically performed. First, according to the previously described procedure, an electrode including the target active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer including the electrode active material can be separated from a current collector. Next, the separated electrode layer is dried under reduced pressure. The obtained electrode layer is ground in a mortar or the like to provide a powder including the target active material, conductive agent, binder, or the like. By dissolving the powder in an acid, a liquid sample including the active material can be prepared. At this time, hydrochloric acid, nitric acid, sulfuric acid, hydrogen fluoride, or the like can be used as the acid. The composition of the active material can be found by subjecting the liquid sample to ICP emission spectrometric analysis.

<Method of Measuring Carbon Amount>

The amount of carbon included in the active material can be measured by using, for example, the active material extracted from an electrode as follows, as the measurement sample. First, the electrode, which has been washed as described above, is placed in water, and thereby the electrode layer is deactivated in water. The active material can be extracted from the deactivated electrode using, for example, a centrifugation apparatus. The extraction treatment is carried out as follows: for example, when polyvinylidene fluoride (PVdF) is used as a binder, the binder component is removed by washing with, for example, N-methyl-2-pyrrolidone (NMP), and then the conductive agent is removed using a mesh having an adequate aperture. If these components slightly remain, they can be removed by heat treatment in the air (e.g., for 30 minutes at 250° C.). The active material extracted from the electrode is dried at 150° C. for 12 hours, weighed in a container, and measured using a measuring device (e.g., CS-444LS manufactured by LECO).

In the case that other active materials are included in the electrode, measurement can be performed as follows. The active material extracted from the electrode is subjected to measurement by transmission electron microscopy-energy dispersive x-ray spectroscopy (TEM-EDX), and the crystal structure of each particle is identified using the selected area diffraction method. The particles having a diffraction pattern assigned to titanium-including composite oxides are selected, and the amount of included carbon is measured. At this time, the areas where carbon is present can be found by acquiring carbon mapping by EDX.

According to the first embodiment, an active material is provided. According to one aspect, the active material includes a composite oxide that includes in an orthorhombic crystal structure thereof, yttrium and at least one selected from the group consisting of alkali metal atoms and alkaline earth metal atoms. Among the crystal sites represented by Wyckoff notations in the orthorhombic crystal structure of the composite oxide, the occupancy of crystal sites that can be occupied by at least one selected from the group consisting of alkali metal atoms and alkaline earth metal atoms is less than 100%.

According to another aspect, the active material includes a composite oxide having an orthorhombic crystal structure. The composite oxide is represented by the general formula $Li_{2+a}M1_{2-b}Ti_{6-c}Y_dM2_eO_{14+\delta}$.

The above-described composite oxide can have a high capacity in the potential range of from 1.0 V to 1.45 V (vs. Li/Li$^+$). As a result of this, the active material according to the first embodiment can exhibit a high energy density and a high battery voltage, and can realize a nonaqueous electrolyte battery which has marked life performance, and for which voltage management is easy.

(Second Embodiment)

According to a second embodiment, a nonaqueous electrolyte battery is provided. This nonaqueous electrolyte battery includes a negative electrode that includes the active material according to the first embodiment, a positive electrode, and a nonaqueous electrolyte.

The nonaqueous electrolyte battery according to the second embodiment can further include a separator provided between the positive electrode and the negative electrode. The positive electrode, the negative electrode, and the separator can compose an electrode group. The nonaqueous electrolyte may be held in the electrode group.

The nonaqueous electrolyte battery according to the second embodiment can further include a container member that houses the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may extend out to the exterior of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode can include a current collector and a negative electrode layer (a negative electrode active material-including layer). The negative electrode layer can be formed on one surface or both of reverse surfaces of the current collector. The negative electrode layer can include a negative electrode active material, and optionally a conductive agent and a binder.

The active material according to the first embodiment may be included as the negative electrode active material in the negative electrode layer. A negative electrode using the active material according to the first embodiment can have a low electrode potential that changes smoothly and moderately within the range of 1.4 V (vs. Li/Li$^+$) to 1.0 V (vs. Li/Li$^+$). Therefore, in the nonaqueous electrolyte battery according to the second embodiment including such a negative electrode, charge-discharge management is easy, and marked life performance, a high energy density, and a high battery voltage can be exhibited.

In the negative electrode, the active material according to the first embodiment may be singly used as the negative electrode active material; however, a mixture where the active material according to the first embodiment is further mixed with another active material may also be used. A mixture where two or more kinds of the active material according to the first embodiment are mixed, or a mixture where the active material according to the first embodiment is mixed with two or more kinds of other active materials may be used, also. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide (TiO$_2$(B)), anatase type titanium dioxide, rutile type titanium dioxide, a hollandite type titanium composite oxide, a monoclinic niobium titanium composite oxide (e.g., $Nb_2TiO_7$), and the like. One of these other active materials may be used in combination with the active material according to the first embodiment. Alternatively, two or more of these other active materials may be used in combination with the active material according to the first embodiment.

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite. One of these may be included as the conductive agent, or two or more may be included in combination as the conductive agent.

The binder is added to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, polyacrylic acid compounds, and imide compounds. One of these may be included as the binder, or two or more may be included in combination as the binder.

The active material, conductive agent and binder in the negative electrode layer are preferably blended in proportions of 68% by mass to 96% by mass, 2% by mass to 30% by mass, and 2% by mass to 30% by mass, respectively. When the amount of conductive agent is 2% by mass or more, the current collection performance of the negative electrode layer can be improved. When the amount of binder is 2% by mass or more, binding between the negative electrode layer and current collector is sufficient, and excellent cycling performances can be expected. On the other hand, an amount of each of the conductive agent and binder is preferably 28% by mass or less, in view of increasing the capacity.

As the current collector, a material which is electrochemically stable at the Li insertion and extraction potential (vs. Li/Li$^+$) of the negative electrode active material is used. The current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the negative electrode.

By using the active material according to the first embodiment, the density of the negative electrode layer (excluding the current collector) can be set in the range of 1.8 g/cm$^3$ to 2.8 g/cm$^3$. The negative electrode in which the density of the negative electrode layer is within this range can exhibit an excellent energy density, and at the same time, exhibit an excellent ability to hold the nonaqueous electrolyte. More preferably, the density of the negative electrode layer is 2.1 g/cm$^3$ to 2.6 g/cm$^3$.

The negative electrode may be produced as follows, for example. A negative electrode active material, a binder, and a conductive agent are suspended in an ordinarily used solvent to prepare a slurry. Next the slurry is applied onto a current collector, and the applied coating is dried to form a negative electrode layer. Then, the current collector and the negative electrode layer thereon are subjected to pressing to thereby produce the negative electrode. The negative electrode may also be produced by forming a negative electrode active material, a binder, and a conductive agent into pellets as the negative electrode layer, and disposing the pellets onto a current collector.

2) Positive Electrode

The positive electrode can include a current collector and a positive electrode layer (positive electrode active material-including layer). The positive electrode layer may be formed on one surface or both of reverse surfaces of the current collector. The positive electrode layer can include a positive electrode active material, and optionally a conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include a compound capable of having Li inserted and extracted. Specific examples thereof include manganese dioxide ($MnO_2$), iron oxide, copper oxide, nickel oxide, lithium manganese composite oxide having a spinel structure (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate [$Fe_2(SO_4)_3$], vanadium oxide (e.g., $V_2O_5$), and lithium nickel cobalt manganese composite oxide. In the above-described formulas, 0<x≤1, and 0<y≤1. As the active material, one of these compounds may be used singly, or plural compounds may be used in combination.

More preferred examples of the positive electrode active material include lithium manganese composite oxide having a spinel structure (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, which have a high positive electrode voltage. In the above-described formulas, 0<x≤1, and 0<y≤1.

When an ordinary temperature molten salt is used as the nonaqueous electrolyte of the battery, preferred examples of the positive electrode active material include lithium iron phosphate, $Li_xVPO_4F$ (0≤x≤1), lithium manganese composite oxide, lithium nickel composite oxide, and lithium nickel cobalt composite oxide. Since these compounds have low reactivity with ordinary temperature molten salts, cycle life can be improved.

The primary particle size of the positive electrode active material is preferably from 100 nm to 1 µm. The positive electrode active material having a primary particle size of 100 nm or more is easy to handle during industrial production. In the positive electrode active material having a primary particle size of 1 µm or less, diffusion of Li ions within solid can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to bind the positive electrode active material with the current collector. Examples of the binder include polytetrafluoroethylene (PTFE), polyvinylidene fluoride (PVdF), fluorine rubber, polyacrylic acid compounds, and imide compounds. One of these may be included as the binder, or two or more may be included in combination as the binder.

The conductive agent is added as necessary, in order to improve the current collection performance, and at the same time, suppress the contact resistance between the positive electrode active material and current collector. Examples of the conductive agent include carbonaceous substances such as acetylene black, carbon black and graphite. One of these may be included as the conductive agent, or two or more may be included in combination as the conductive agent.

In the positive electrode layer, the positive electrode active material and binder are preferably included in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of the insulator in the electrode can be reduced, and thereby the internal resistance can be decreased.

When a conductive agent is added, the positive electrode active material, binder, and conductive agent are preferably included in proportions of 77% by mass to 95% by mass, 2% by mass to 20% by mass, and 3% by mass to 15% by mass, respectively. When the amount of the conductive agent is 3% by mass or more, the above-described effects can be expressed. By setting the amount of the positive electrode conductive agent to 15% by mass or less, the decomposition of a nonaqueous electrolyte on the surface of the positive electrode conductive agent during high-temperature storage can be reduced.

The current collector is preferably an aluminum foil, or an aluminum alloy foil including one or more elements selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium included in the aluminum foil or aluminum alloy foil is preferably 1% by mass or less.

The positive electrode may be produced as follows, for example. A positive electrode active material, a binder, and a conductive agent, which is added as necessary, are suspended in an appropriate solvent to prepare a slurry. Next, the slurry is applied to a positive electrode current collector, and the applied coating is dried to form a positive electrode layer. Then, the current collector and positive electrode layer thereon are subjected to pressing to form the positive electrode. The positive electrode may also be produced by forming an active material, a binder, and a conductive agent, which is added as necessary, into pellets as the positive electrode layer, and disposing the pellets onto a current collector.

3) Nonaqueous Electrolyte

The nonaqueous electrolyte may be, for example, a liquid nonaqueous electrolyte which is prepared by dissolving an electrolyte in an organic solvent, or gel like nonaqueous electrolyte which is a composite of a liquid electrolyte and a polymer material.

The liquid nonaqueous electrolyte is preferably prepared by dissolving an electrolyte in an organic solvent at a concentration of from 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary temperature molten salt (ionic melt) including lithium ions, a polymer solid electrolyte, or an inorganic solid electrolyte.

The ordinary temperature molten salt (ionic melt) means compounds among organic salts made of combinations of organic cations and anions, which are able to exist in a liquid state at ordinary temperature (15° C. to 25° C.). The ordinary temperature molten salt includes an ordinary temperature molten salt which exists alone as a liquid, an ordinary temperature molten salt which becomes a liquid upon mixing with an electrolyte, and an ordinary temperature molten salt which becomes a liquid when dissolved in an organic solvent. In general, the melting point of the ordinary temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having Li ion conductivity.

4) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

5) Container Member

As the container member, for example, a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, or a large battery mounted on vehicles such as two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including one or more of an element such as magnesium, zinc, or silicon is preferable. If a transition metal such as iron, copper, nickel, or chromium is included in the alloy, the included amount thereof is preferably set to 1% by mass or less.

6) Positive Electrode Terminal and Negative Electrode Terminal

The positive electrode terminal may be made of, for example, a material that has electrical stability in the potential range of 3 V to 5 V (vs. Li/$Li^+$) relative to the oxidation-and-reduction potential of Li, and electrical conductivity. Specifically, the positive electrode terminal is made of aluminum or an aluminum alloy including one or more of Mg, Ti, Zn, Mn, Fe, Cu, Si, or the like. The positive electrode terminal is preferably made of the same material as the positive electrode current collector in order to reduce contact resistance with the positive electrode current collector.

The negative electrode terminal may be made of a material that is electrochemically stable at the potential (vs. Li/$Li^+$) at which Li is inserted into and extracted from the above-described negative electrode active material, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, the nonaqueous electrolyte battery according to the second embodiment will be more specifically described with reference to the drawings.

First, an example of the nonaqueous electrolyte battery according to the second embodiment will be described with reference to FIGS. 4 and 5.

FIG. 4 is a cross-sectional view of an example of a nonaqueous electrolyte battery according to the second embodiment. FIG. 5 is an enlarged cross-sectional view showing section A in FIG. 4.

Figure 5:
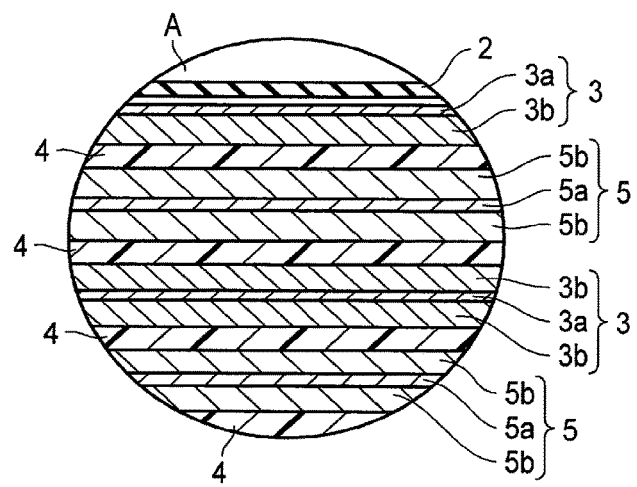
FIG. 5 is an enlarged cross-sectional view of section A in FIG. 4.

A nonaqueous electrolyte battery 10 shown in FIGS. 4 and 5 includes a bag-shaped container member 2 shown in FIG. 4, an electrode group 1 shown in FIGS. 4 and 5, and a nonaqueous electrolyte (not shown). The electrode group 1 and the nonaqueous electrolyte are housed in the container member 2. The nonaqueous electrolyte is held in the electrode group 1.

The bag shaped container member 2 is made of a laminate film including two resin layers and a metal layer sandwiched between the resin layers.

As shown in FIG. 4, the electrode group 1 is a wound electrode group in a flat form. The wound electrode group 1 in a flat form is formed by, spirally winding a stack where stacked, in order from the outside, are a negative electrode 3, a separator 4, a positive electrode 5, and a separator 4, as shown in FIG. 5, and then press-forming the wound laminate.

The negative electrode 3 includes a negative electrode current collector 3a and a negative electrode layer 3b. In the negative electrode layer 3b, the active material according to the first embodiment is included. Of the negative electrode 3, the portion located on the outermost layer of the wound electrode group 1 has a configuration in which a negative electrode layer 3b is formed only on one side which is the internal surface of a negative electrode current collector 3a, as shown in FIG. 4. For the other portions of the negative electrode 3, the negative electrode layers 3b are formed on both of reverse surfaces of the negative electrode current collector 3a.

The positive electrode 5 includes a positive electrode current collector 5a and positive electrode layers 5b formed on both of reverse surfaces of the positive electrode current collector 5a.

As shown in FIG. 4, in the vicinity of the outer peripheral edge of the wound electrode group 1, a negative electrode terminal 6 is connected to the portion of the negative electrode current collector 3a located at the outermost layer of the negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2.

The nonaqueous electrolyte battery 10 shown in FIGS. 4 and 5 can be produced according to the following procedure, for example. First, an electrode group 1 is produced. The electrode group 1 is then enclosed in a bag-shaped container member 2. Upon which, one end of each the negative electrode terminal 6 and positive electrode terminal 7 are made to protrude outside the container member 2. Next, the circumference of the container member 2 is heat-sealed with a portion left unsealed. Next, treating a portion that had not been heat-sealed as an opening of the bag shaped container member 2, for example, a liquid nonaqueous electrolyte is poured in via this opening. Finally, the opening is heat-sealed, and thereby the wound electrode group 1 and the liquid nonaqueous electrolyte are completely sealed.

Figure 6:
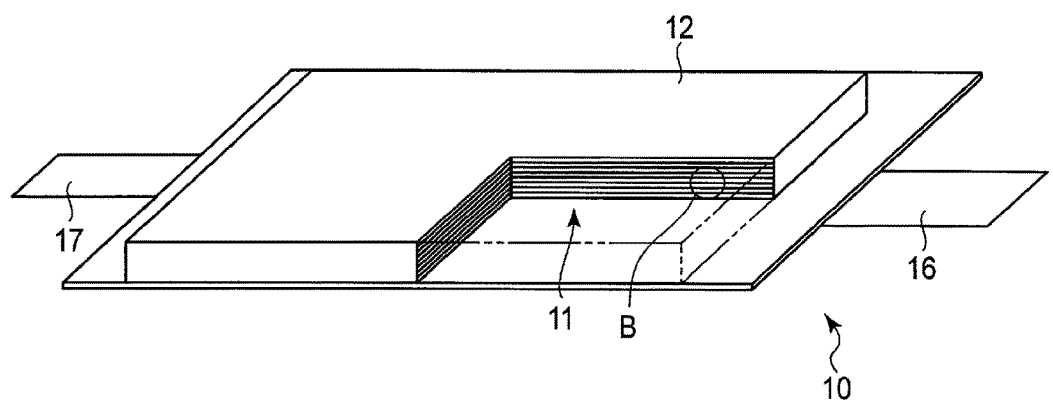
FIG. 6 is a partially cut-out perspective view schematically showing another nonaqueous electrolyte battery according to the second embodiment.
Figure 7:
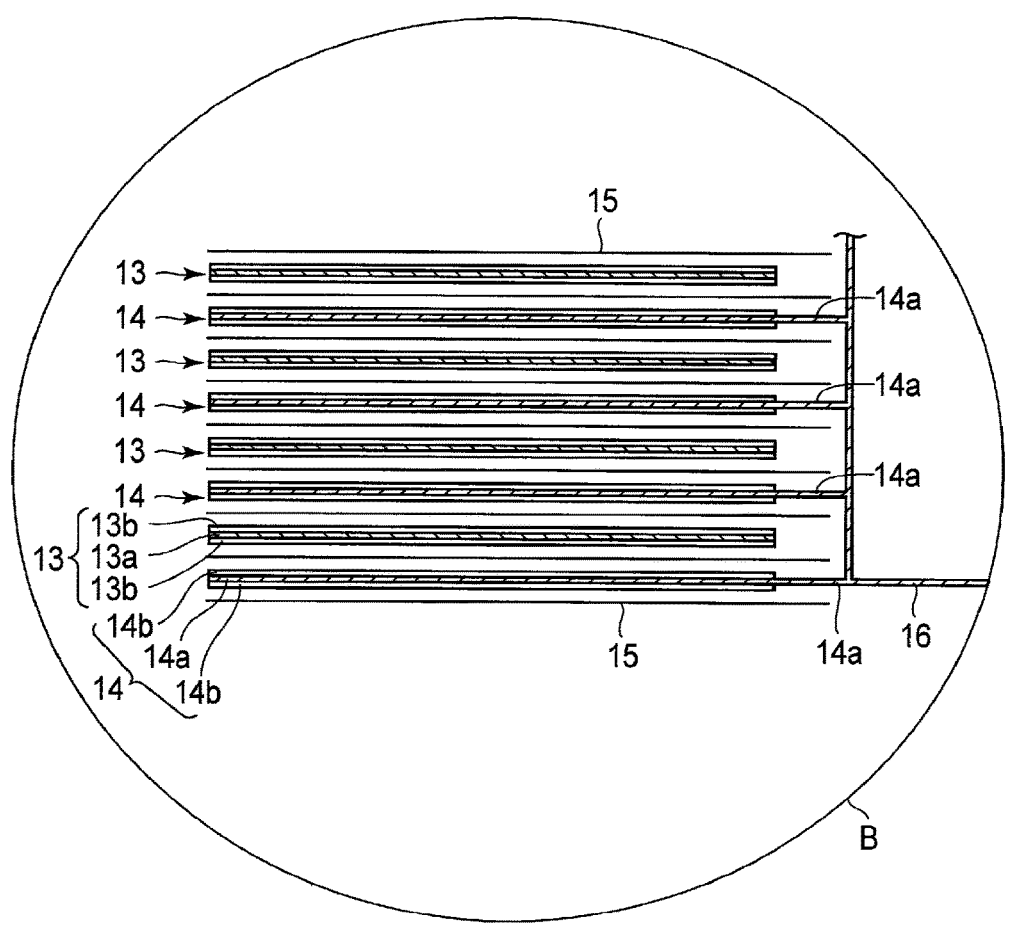
FIG. 7 is an enlarged cross sectional view of section B in FIG. 6.

The nonaqueous electrolyte battery according to the second embodiment is not limited to the example nonaqueous electrolyte secondary battery shown above in FIGS. 4 and 5, and may be, for example, a battery configured as shown in FIGS. 6 and 7.

FIG. 6 is a partially cut-out perspective view schematically showing another example of a nonaqueous electrolyte battery according to the second embodiment. FIG. 7 is an enlarged cross-sectional view showing section B in FIG. 6.

A nonaqueous electrolyte battery 10 shown in FIGS. 6 and 7 includes an electrode group 11 shown in FIGS. 6 and 7, a container member 12 shown in FIG. 6, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 7, the electrode group 11 is a stacked electrode group. As shown in FIG. 7, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and positive electrode layers 13b supported on both of reverse surfaces of the positive electrode current collector 13a. The electrode group 11 includes plural negative electrodes 14. Each of the plural negative electrodes 14 includes a negative electrode current collector 14a, and negative electrode layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrodes 13 protrude from the positive electrodes 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

The nonaqueous electrolyte battery according to the second embodiment includes the active material according to the first embodiment. Thus, the nonaqueous electrolyte battery according to the second embodiment can exhibit a high energy density and high battery voltage, exhibit marked life performance, and voltage management can be performed easily.

In addition, when the nonaqueous electrolyte battery is, for example, combined with a 12 V lead storage battery for automobiles to thereby construct a motor assist type hybrid car or an idling stop system, it is possible to design a setting of battery pack voltage that is capable of preventing over-discharge of a lead storage battery upon a high load or is capable of adapting to a voltage fluctuation upon an input of regenerative energy. This is because, in the end period of discharge of the nonaqueous electrolyte battery of the second embodiment, the decrease in voltage is smooth and moderate. Since the voltage changes smoothly in accordance with the charge-and-discharge of the nonaqueous electrolyte battery, the state-of-charge (SOC) can be managed based on the voltage change. Accordingly, the voltage in the end period of discharge can be easily managed, and the nonaqueous electrolyte battery can be favorably used in a system where the battery is combined with the lead storage battery.

Further, in the case where a spinel lithium titanate ($Li_4Ti_5O_{12}$) is used for the negative electrode, the average operating potential is low. Thus, it is necessary to connect six batteries in series, in order to obtain a voltage compatible with a lead storage battery for automobiles. On the other hand, when the active material of the first embodiment is used as the negative electrode active material, the average operating potential of the negative electrode is decreased, and the battery voltage is increased. Thus, even if the number of the batteries connected in series in the battery pack is changed to five, a battery pack capable of exhibiting a voltage compatible with the 12 V lead storage battery for automobiles can be constructed. Hence, the nonaqueous electrolyte battery according to the second embodiment is able to provide a small size battery pack capable of exhibiting a low resistance and a high energy density at a low cost.

(Third Embodiment)

According to a third embodiment, a battery pack is provided. The battery pack includes the nonaqueous electrolyte battery according to the second embodiment.

The battery pack according to the third embodiment may include one or more nonaqueous electrolyte batteries (unit cells) according to the second embodiment described above. The plural nonaqueous electrolyte batteries, which may be included in the battery pack according to the third embodiment, may be electrically connected in series, in parallel, or in a combination of in a series and in parallel. The plural nonaqueous electrolyte batteries may be electrically connected in series or in parallel, to structure a battery module. The battery pack according to the third embodiment may include plural battery modules.

The battery pack according to the third embodiment may further include a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the third embodiment will be described with reference to the drawings.

Figure 8:
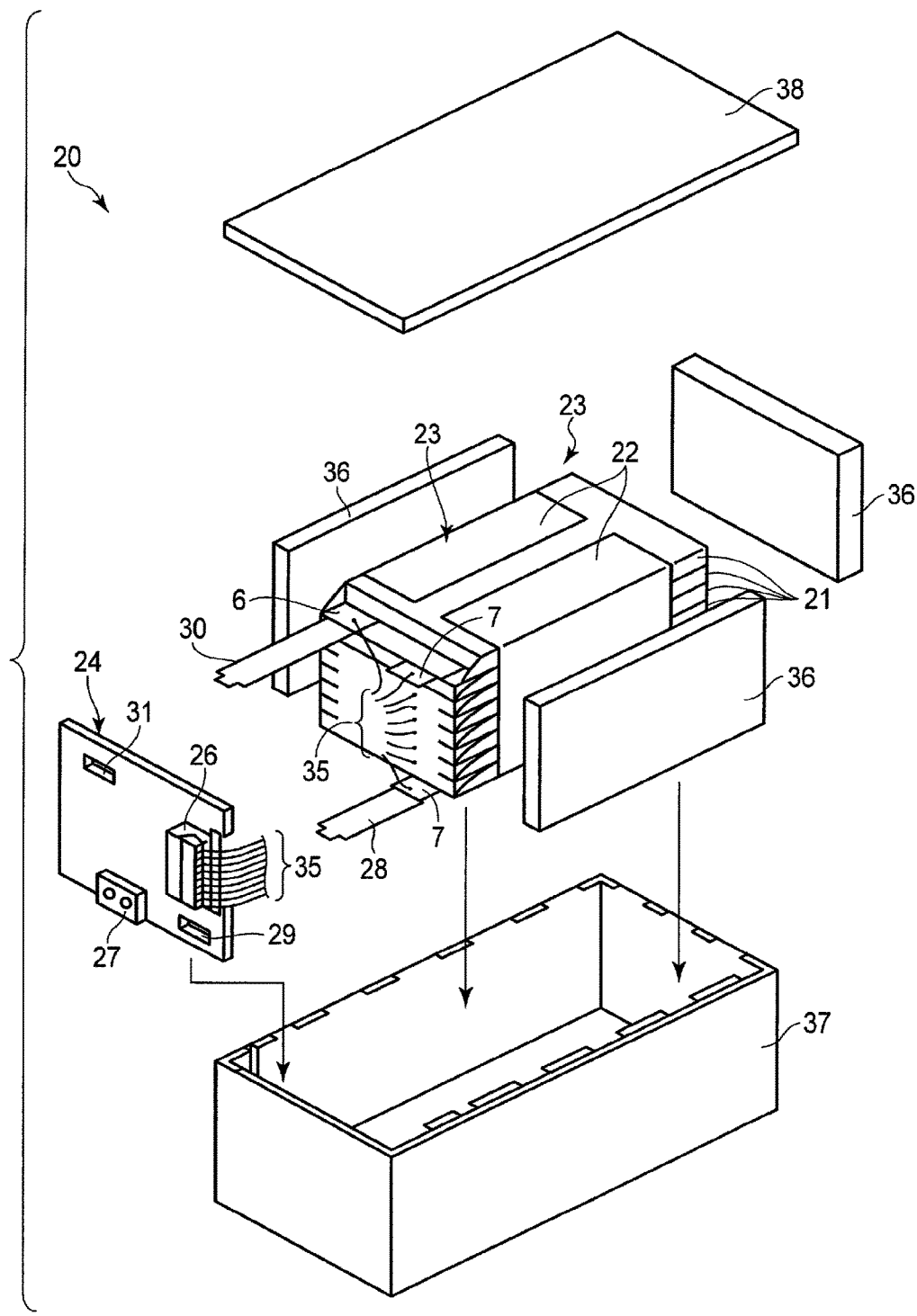
FIG. 8 is an exploded perspective view of an example of a battery pack according to a third embodiment.
Figure 9:
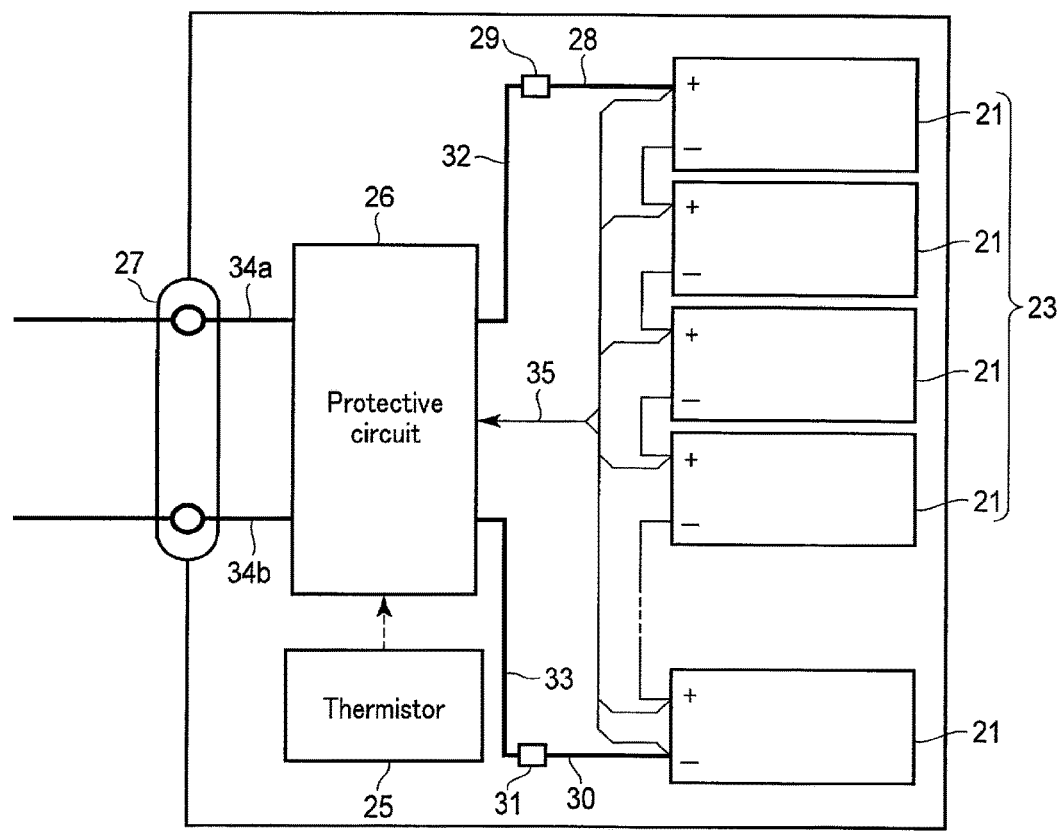
FIG. 9 is a block diagram showing an electric circuit of the battery pack in FIG. 8.

FIG. 8 is an exploded perspective view of an example of the battery pack according to the third embodiment. FIG. 9 is a block diagram showing an electric circuit of the battery pack of FIG. 8.

A battery pack 20 shown in FIGS. 8 and 9 includes plural unit cells 21. The plural unit cells 21 are flat nonaqueous electrolyte batteries 10 described with reference to FIGS. 4 and 5.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 9.

A printed wiring board 24 is arranged to face toward the side plane of the battery module 23 where the negative electrode terminal 6 and the positive electrode terminal 7 extend out from. A thermistor 25, a protective circuit 26, and an external power distribution terminal 27 are mounted on the printed wiring board 24 as shown in FIG. 9. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the external power distribution terminal 27, under a predetermined condition. The predetermined condition indicates, for example, the case where the temperature detected by the thermistor 25 becomes a predetermined temperature or more. Another example of the predetermined condition is when over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 8 and 9, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 8 and 9, an embodiment has been shown where plural unit cells 21 are connected in series; however, the connection may be made in parallel in order to increase battery capacity. Alternatively, connection in series may be combined with connection in parallel. Assembled battery packs may be connected further in series and/or in parallel.

Furthermore, although the battery pack shown in FIGS. 8 and 9 include plural unit cells 21, the battery pack according to the third embodiment may include only one unit cell 21.

The aspect of the battery pack according to the third embodiment may be appropriately changed depending on its application. The battery pack according to the third embodiment can be suitably used in applications in which cycle performance is demanded to be excellent when large current is taken out. Specifically the battery pack is used as a power source of a digital camera, or for example, a battery for mounting on a vehicle such as a two- to four-wheeled hybrid electric automobile, a two- to four-wheeled electric automobile or a power-assisted bicycle, as a stationary battery, or as a battery for installing on rail way cars. In particular, the battery pack is suitably used for a battery mounted on a vehicle.

In a vehicle including the battery pack according to the third embodiment, the battery pack is configured, for example, to recover regenerative energy caused by power of the vehicle, such as automobiles. Examples of the vehicle include two to four-wheeled hybrid electric automobiles, two to four-wheeled electric automobiles, electric assist bicycles, and rail way cars such as electric trains.

FIG. 12 shows an example of an automobile that includes a battery pack according to the third embodiment.

The automobile 71 shown in FIG. 12 includes a battery pack 72, which is an example of the battery pack according to the third embodiment, mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Thus, the battery pack according to the third embodiment can exhibit a high energy density, high battery voltage, and excellent life performance.

Furthermore, since the battery pack includes the nonaqueous electrolyte battery according to the second embodiment, decrease of voltage is smooth during the end period of discharge for the battery pack. Thus, SOC (state of charge) of the battery pack can be managed based on voltage change, and therefore, voltage management at the end period of discharge can be performed easily.

EXAMPLES

Hereinafter, the above embodiments will be described in more detail with reference to Examples. The identification of a crystal phase of synthesized orthorhombic composite oxides and the estimation of crystal structure were performed by the powder X-ray diffraction using Cu-Kα rays, using procedures described above. In addition, the composition of products was analyzed by the ICP method, using procedures described above, to examine that a target product was obtained.

Example 1

In Example 1, the beaker cell of Example 1 was produced by the following procedures.

<Preparation of Active Material>

The compound having the composition shown in Table 1 was synthesized as follows. First, as shown in Table 2, lithium carbonate ($Li_2CO_3$), sodium carbonate ($Na_2CO_3$), yttrium oxide ($Y_2O_3$), titanium dioxide ($TiO_2$), and niobium oxide ($Nb_3O_5$) were mixed at a molar ratio of 1:0.6:0.05:0.45. The mixture was pre-calcined in a in muffle furnace at 650° C. for 2 hours, and 800° C. for 12 hours. Subsequently, the pre-calcined product was ground with a mill, thereby grinding apart aggregates.

Next, the pre-calcined product was heated in a muffle furnace at 950° C. for 6 hours, thereby carrying out main-calcination. At this time, main-calcination was carried out with the outside of the pre-calcined powder covered with a mixture having the same composition, serving as an outer shell for preventing vaporization of Li. After the main-calcination, the outer shell was removed.

Subsequently, in order to improve crystallinity of the orthorhombic composite oxide, the product was annealed in a muffle furnace at 850° C. for 6 hours, immediately taken out from the furnace, and immersed in liquid nitrogen for quenching, thereby obtaining the composite oxide of Example 1.

The result of the ICP analysis indicated that the composite oxide having the target composition was obtained. From this, it was found that by covering the pre-calcined product with an outer shell during main-calcination as described above, vaporization of Li had not occurred.

<Specific Surface Area>

The specific surface area of the composite oxide thus obtained was measured by the above-described method. As a result of this, the specific surface area of the composite oxide of Example 1 was found to be 6.6 $m^2/g$.

<Average Particle Size>

As a result of examination by SEM, the composite oxide of Example 1 was found to be in a form of singular particles. In addition, the average particle size of the composite oxide of Example 1 was measured by the procedures described above. As a result of this, the average primary particle size of the composite oxide of Example 1 was found to be 1.15μ μm.

<Production of Electrode>

The composite oxide of Example 1 as an active material, acetylene black as a conductive agent, and polyvinylidene fluoride (PVdF) as a binder were added to N-methylpyrrolidone (NMP), and mixed to prepare a slurry. At this time, the mass ratio of active material:acetylene black:PVdF was 90:5:5. The slurry was applied to both of reverse surfaces of a current collector made of an aluminum foil having a thickness of 12 μm, and dried. Thereafter, by subjecting to pressing, the electrode of Example 1 having an electrode density (not including current collector) of 2.2 $g/cm^3$ was obtained.

<Preparation of Liquid Nonaqueous Electrolyte>

Ethylene carbonate (EC) and diethyl carbonate (DEC) were mixed at a capacity ratio of 1:2, thereby obtaining a mixed solvent. $LiPF_6$ as an electrolyte was dissolved in the mixed solvent at a concentration of 1 M, thereby obtaining a liquid nonaqueous electrolyte.

<Production of Beaker Cell>

A beaker cell was produced using the electrode produced above as a working electrode, and lithium metal as counter electrode and reference electrode. The above-described liquid nonaqueous electrolyte was poured into the beaker cell, thereby completing the beaker cell of Example 1.

Example 2

In Example 2, the composite oxide of Example 2 was synthesized in the same manner as in Example 1, except for that, in order to synthesize the compound having the composition shown in Table 1, the raw material mixing ratio shown in Table 2 was used. In the same manner as the composite oxide of Example 1, the composite oxide thus obtained corresponds to a composite oxide having voids introduced into the titanium-including composite oxide phase belonging to the space group Fmmm and represented by the general formula $Li_{2+a}M1_{2-b}Ti_{6-c}M2_dO_{14+\delta}$.

In addition, the beaker cell of Example 2 was produced in the same manner as in Example 1, except for that the composite oxide of Example 2 was used as the active material.

Example 3

In Example 3, first, a composite oxide was synthesized in the same manner as in Example 2. Then, the composite oxide was subjected to carbon coating as follows.

100 g of the composite oxide of Example 2 was mixed with 10 g of maltose. Subsequently, the mixture was thoroughly dispersed using a stirrer. Thereafter, the mixture was dried by evaporation. In this manner, a composite was obtained, where the particle surface of a composite oxide was uniformly coated with an organic substance. Subsequently, the composite thus obtained was calcined at a temperature of 500° C. for one hour in an inert atmosphere under argon flow, thereby carrying out carbonization heat treatment, and thus carbonizing the organic substance. In this manner, the composite oxide of Example 3 was obtained.

In addition, the beaker cell of Example 3 was produced in the same manner as in Example 1, except for that the composite oxide of Example 3 was used as the active material.

Example 4

In Example 4, first, a composite oxide was synthesized in the same manner as in Example 2. Then, the composite oxide thus obtained was heated in a reducing atmosphere at 800° C. for 1 hour under a flow of nitrogen gas including 3% hydrogen, thereby reducing a part of oxide ions. In this manner, the composite oxide of Example 4 having the composition shown in Table 1 was synthesized.

In addition, the beaker cell of Example 4 was produced in the same manner as in Example 1, except for that the composite oxide of Example 4 was used as the active material.

Example 5

In Example 5, a titanium-including composite oxide having the same composition as Example 2 was synthesized using a conventional calcination method. More specifically, the composite oxide of Example 5 was synthesized using a calcination method without pre-calcination, any measure for preventing vaporization of Li, and annealing treatment for crystal growth. Specifically, the raw materials were mixed at the mixing ratio shown in Table 2, and the mixture thus obtained was calcined at 950° C. for 12 hours. Subsequently, the calcined product was cooled within the furnace to obtain the composite oxide of Example 5.

In addition, the beaker cell of Example 5 was produced in the same manner as in Example 1, except for that the composite oxide of Example 5 was used as the active material.

Example 6 to 24

In Examples 6 to 24, the composite oxides of Examples 6 to 24 were synthesized in the same manner as in Example 1, except that the raw material mixing ratio shown in Table 2 was used for synthesizing the compound having the composition shown in Table 1. The composite oxides thus obtained had compositions different from the composite oxide of Example 1; however, in the same manner as in Example 1, the obtained composite oxides correspond to composite oxides having vacancies introduced into the titanium-including composite oxide phase belonging to the space group Fmmm and represented by the general formula $Li_{2+a}M1_{2-b}Ti_{6-c}M2_dO_{14+\delta}$.

In addition, the beaker cells of Examples 6 to 24 were produced in the same manner as in Example 1, except for that the composite oxides of Examples 6 to 24 were used as the active material.

Example 25 to 31

In Example 25 to 31, synthesis was carried out in the same manner as in Example 1, except for that the raw material were mixed at the mixing ratios shown in Table 2 for synthesizing the compounds having the compositions shown in Table 1. The products thus obtained were used as the composite oxides of Examples 25 to 31.

In addition, the beaker cells of Examples 25 to 31 were produced in the same manner as in Example 1, except for that the composite oxides of Example 25 to 31 were used as the active materials.

Comparative Examples 1 to 3

The products of Comparative Examples 1 to 3 were synthesized by the following method.

First, as the starting material, the commercially available oxide and carbonate reagent shown in Table 2 were prepared in such a manner that the molar ratio shown in Table 1 is satisfied, and the total weight would be 50 g. In a preliminary experiment, the amount of Li vaporization during calcination was analyzed, and vaporization corresponding to 3% lithium carbonate was observed. Therefore, lithium carbonate was prepared 3% in excess of the target composition.

Subsequently, the starting materials prepared as described above were mixed, and the mixture was poured into an agate pod for ball milling (capacity: 300 mL). Agate balls having diameters of 10 mm and 5 mm were placed in the pod in a number ratio of 1:1 and filling one third of the pod capacity. Thereafter, 50 mL of ethanol was placed in the pod, and wet-mixing was carried out at 120 rpm for 60 minutes, thereby obtaining a mixture.

In the next step, the mixture thus obtained was placed in an electric furnace, and subjected to heat treatment by the following method.

First, pre-calcination was carried out at a temperature of 650° C. for 6 hours in air. Subsequently, the powder obtained after pre-calcination was taken out from the furnace, reground, and further mixed.

The mixture thus obtained was subsequently subjected to the first calcination at a temperature of 900° C. for 6 hours. After calcination, the calcined powder was taken out from the furnace, and the calcined powder was mixed again.

Subsequently, the remixed calcined powder was placed in the furnace, and subjected to the second calcination in the air at a temperature of 900° C. for 6 hours. Thereafter, the temperature in the electric furnace was maintained at 400° C. for 2 hours, and then quickly cooled to room temperature. Next, the calcined powder was taken out from the furnace, and the calcined powder was mixed again. The powder obtained after the second calcination, i.e., as a result of calcination at a temperature of 900° C. for a total of 12 hours, was used as the composite oxide of Comparative Examples 1 to 3.

In addition, the beaker cells of Comparative Examples 1 to 3 were produced in the same manner as in Example 1, except for that the composite oxide of Comparative Examples 1 to 3 were used as the active materials.

Comparative Example 4

In Comparative Example 4, the compound $Li_2(Sr_{0.75}Na_{0.25})Ti_{5.75}O_{14}$ was synthesized by the solid-phase reaction method described in the reference "Electrochemistry Communications, 5, (2003), pp. 435-438". The starting materials and molar ratio were as shown in Table 1. The product thus obtained was used as the composite oxide of Comparative Example 4.

In addition, the beaker cell of Comparative Example 4 was produced in the same manner as in Example 1, except for that the composite oxide of Comparative Example 4 was used as the active material.

TABLE 1

|  | Composition | a | b | c | d | e | δ |
|---|---|---|---|---|---|---|---|
| Comparative Example 1 | $Li_2Na_2Ti_6O_{14}$ | 0 | 0 | 0 | 0 | 0 | 0 |
| Comparative Example 2 | $Li_2SrTi_6O_{14}$ | 0 | 1.0 | 0 | 0 | 0 | 0 |
| Comparative Example 3 | $Li_2Na_{1.5}Ti_{5.5}Nb_{0.5}O_{14}$ | 0 | 0.5 | 0.5 | 0 | 0.5 | 0 |
| Comparative Example 4 | $Li_2(Sr_{0.75}Na_{0.25})Ti_{5.75}Nb_{0.25}O_{14}$ | 0 | 1.0 | 0.25 | 0 | 0.25 | 0 |
| Example 1 | $Li_2Na_{1.2}Ti_5(Y_{0.1}Nb_{0.9})O_{14}$ | 0 | 0.8 | 1.0 | 0.1 | 0.9 | 0 |
| Example 2 | $Li_2Na_{1.5}Ti_5(Y_{0.25}Nb_{0.75})O_{14}$ | 0 | 0.5 | 1.0 | 0.25 | 0.75 | 0 |
| Example 3 | $Li_2Na_{1.5}Ti_5(Y_{0.25}Nb_{0.75})O_{14}$ | 0 | 0.5 | 1.0 | 0.25 | 0.75 | 0 |
| Example 4 | $Li_2Na_{1.5}Ti_5(Y_{0.25}Nb_{0.75})O_{13.5}$ | 0 | 0.5 | 1.0 | 0.25 | 0.75 | −0.5 |
| Example 5 | $Li_2Na_{1.5}Ti_5(Y_{0.25}Nb_{0.75})O_{14}$ | 0 | 0.5 | 1.0 | 0.25 | 0.75 | 0 |
| Example 6 | $Li_2Na_{1.8}Ti_5(Y_{0.4}Nb_{0.6})O_{14}$ | 0 | 0.2 | 1.0 | 0.4 | 0.6 | 0 |
| Example 7 | $Li_2Sr_{0.05}Ti_{0.1}(Y_{2.0}Nb_{3.9})O_{14}$ | 0 | 1.95 | 5.9 | 2.0 | 3.9 | 0 |
| Example 8 | $Li_2Mg_{0.05}Ti_{0.1}(Y_{2.0}Nb_{3.9})O_{14}$ | 0 | 1.95 | 5.9 | 2.0 | 3.9 | 0 |
| Example 9 | $Li_2Na_{1.4}Cs_{0.1}Ti_5(Y_{0.25}Nb_{0.75})O_{14}$ | 0 | 0.5 | 1.0 | 0.25 | 0.75 | 0 |
| Example 10 | $Li_2Na_{1.4}Rb_{0.1}Ti_5(Y_{0.25}Nb_{0.75})O_{14}$ | 0 | 0.5 | 1.0 | 0.25 | 0.75 | 0 |
| Example 11 | $Li_2Na_{1.4}K_{0.1}Ti_5(Y_{0.25}Nb_{0.75})O_{14}$ | 0 | 0.5 | 1.0 | 0.25 | 0.75 | 0 |
| Example 12 | $Li_2Na_{1.5}Ti_{4.5}(Y_{0.25}Nb_{0.75}Zr_{0.5})O_{14}$ | 0 | 0.5 | 1.5 | 0.25 | 1.25 | 0 |
| Example 13 | $Li_2Na_{1.5}Ti_{4.5}(Y_{0.25}Nb_{0.75}Sn_{0.5})O_{14}$ | 0 | 0.5 | 1.5 | 0.25 | 1.25 | 0 |
| Example 14 | $Li_2Na_{1.5}Ti_5(Y_{0.25}Nb_{0.65}V_{0.1})O_{14}$ | 0 | 0.5 | 1.0 | 0.25 | 0.75 | 0 |
| Example 15 | $Li_2Na_{1.5}Ti_5(Y_{0.25}Nb_{0.65}Ta_{0.1})O_{14}$ | 0 | 0.5 | 1.0 | 0.25 | 0.75 | 0 |
| Example 16 | $Li_2Na_{1.4}Ti_5(Y_{0.25}Nb_{0.65}Mo_{0.1})O_{14}$ | 0 | 0.6 | 1.0 | 0.25 | 0.75 | 0 |
| Example 17 | $Li_2Na_{1.4}Ti_5(Y_{0.25}Nb_{0.65}W_{0.1})O_{14}$ | 0 | 0.6 | 1.0 | 0.25 | 0.75 | 0 |
| Example 18 | $Li_2Na_{1.7}Ti_5(Y_{0.25}Nb_{0.65}Fe_{0.1})O_{14}$ | 0 | 0.3 | 1.0 | 0.25 | 0.75 | 0 |
| Example 19 | $Li_2Na_{1.7}Ti_5(Y_{0.25}Nb_{0.65}Co_{0.1})O_{14}$ | 0 | 0.3 | 1.0 | 0.25 | 0.75 | 0 |
| Example 20 | $Li_2Na_{1.7}Ti_5(Y_{0.25}Nb_{0.65}Cr_{0.1})O_{14}$ | 0 | 0.3 | 1.0 | 0.25 | 0.75 | 0 |
| Example 21 | $Li_2Na_{1.7}Ti_5(Y_{0.25}Nb_{0.65}Mn_{0.1})O_{14}$ | 0 | 0.3 | 1.0 | 0.25 | 0.75 | 0 |
| Example 22 | $Li_2Na_{1.7}Ti_5(Y_{0.25}Nb_{0.65}Ni_{0.1})O_{14}$ | 0 | 0.3 | 1.0 | 0.25 | 0.75 | 0 |
| Example 23 | $Li_2Na_{1.7}Ti_5(Y_{0.25}Nb_{0.65}Al_{0.1})O_{14}$ | 0 | 0.3 | 1.0 | 0.25 | 0.75 | 0 |
| Example 24 | $Li_{2.2}Na_{1.5}Ti_5(Y_{0.25}Nb_{0.75})O_{14}$ | 0.2 | 0.5 | 1.0 | 0.25 | 0.75 | 0 |
| Example 25 | $Li_2Na_2Ti_{5.8}(Y_{0.1}Nb_{0.1})O_{14}$ | 0 | 0 | 0.2 | 0.1 | 0.1 | 0 |
| Example 26 | $Li_2(Sr_{0.3}Na_{0.7})Ti_5(Y_{0.15}Nb_{0.85})O_{14}$ | 0 | 1.0 | 1.0 | 0.15 | 0.85 | 0 |
| Example 27 | $Li_2(Sr_{0.5}Na_{0.5})Ti_5(Y_{0.25}Nb_{0.75})O_{14}$ | 0 | 1.0 | 1.0 | 0.25 | 0.75 | 0 |
| Example 28 | $Li_2(Sr_{0.8}Na_{0.2})Ti_5(Y_{0.4}Nb_{0.6})O_{14}$ | 0 | 1.0 | 1.0 | 0.4 | 0.6 | 0 |
| Example 29 | $Li_2SrTi_{5.8}(Y_{0.1}Nb_{0.1})O_{14}$ | 0 | 1.0 | 0.2 | 0.1 | 0.1 | 0 |
| Example 30 | $Li_2(Ca_{0.5}Na_{0.50})Ti_5(Y_{0.25}Nb_{0.75})O_{14}$ | 0 | 1.0 | 1.0 | 0.25 | 0.75 | 0 |
| Example 31 | $Li_2(Ba_{0.5}Na_{0.50})Ti_5(Y_{0.25}Nb_{0.75})O_{14}$ | 0 | 1.0 | 1.0 | 0.25 | 0.75 | 0 |

TABLE 2

|  | Li source/amount | M1 source/amount | Y source/amount | Ti source/amount | M2 source/amount |
|---|---|---|---|---|---|
| Comparative Example 1 | $Li_2CO_3$/1.0 | $Na_2CO_3$/1.0 | — | $TiO_2$/6.0 | — |
| Comparative Example 2 | $Li_2CO_3$/1.0 | $SrCO_3$/1.0 | — | $TiO_2$/6.0 | — |

TABLE 2-continued

| | Li source/amount | M1 source/amount | Y source/amount | Ti source/amount | M2 source/amount |
|---|---|---|---|---|---|
| Comparative Example 3 | $Li_2CO_3$/1.0 | $Na_2CO_3$/0.75 | — | $TiO_2$/5.5 | $Nb_2O_5$/0.25 |
| Comparative Example 4 | $Li_2CO_3$/1.0 | $SrCO_3$/0.75 $Na_2CO_3$/0.125 | — | $TiO_2$/5.75 | $Nb_2O_5$/0.125 |
| Example 1 | $Li_2CO_3$/1.0 | $Na_2CO_3$/0.6 | $Y_2O_3$/0.05 | $TiO_2$/5.0 | $Nb_2O_5$/0.45 |
| Example 2 | $Li_2CO_3$/1.0 | $Na_2CO_3$/0.75 | $Y_2O_3$/0.125 | $TiO_2$/5.0 | $Nb_2O_5$/0.375 |
| Example 3 | $Li_2CO_3$/1.0 | $Na_2CO_3$/0.75 | $Y_2O_3$/0.125 | $TiO_2$/5.0 | $Nb_2O_5$/0.375 |
| Example 4 | $Li_2CO_3$/1.0 | $Na_2CO_3$/0.75 | $Y_2O_3$/0.125 | $TiO_2$/5.0 | $Nb_2O_5$/0.375 |
| Example 5 | $Li_2CO_3$/1.0 | $Na_2CO_3$/0.75 | $Y_2O_3$/0.125 | $TiO_2$/5.0 | $Nb_2O_5$/0.375 |
| Example 6 | $Li_2CO_3$/1.0 | $Na_2CO_3$/0.9 | $Y_2O_3$/0.2 | $TiO_2$/5.0 | $Nb_2O_5$/0.3 |
| Example 7 | $Li_2CO_3$/1.0 | $SrCO_3$/0.05 | $Y_2O_3$/1.0 | $TiO_2$/0.1 | $Nb_2O_5$/1.95 |
| Example 8 | $Li_2CO_3$/1.0 | MgO/0.05 | $Y_2O_3$/1.0 | $TiO_2$/0.1 | $Nb_2O_5$/1.95 |
| Example 9 | $Li_2CO_3$/1.0 | $Cs_2CO_3$/0.05 $Na_2CO_3$/0.7 | $Y_2O_3$/0.125 | $TiO_2$/5.0 | $Nb_2O_5$/0.375 |
| Example 10 | $Li_2CO_3$/1.0 | $Rb_2CO_3$/0.05 $Na_2CO_3$/0.7 | $Y_2O_3$/0.125 | $TiO_2$/5.0 | $Nb_2O_5$/0.375 |
| Example 11 | $Li_2CO_3$/1.0 | $K_2CO_3$/0.05 $Na_2CO_3$/0.7 | $Y_2O_3$/0.125 | $TiO_2$/5.0 | $Nb_2O_5$/0.375 |
| Example 12 | $Li_2CO_3$/1.0 | $Na_2CO_3$/0.75 | $Y_2O_3$/0.125 | $TiO_2$/4.5 $ZrO_2$/0.5 | $Nb_2O_5$/0.375 |
| Example 13 | $Li_2CO_3$/1.0 | $Na_2CO_3$/0.75 | $Y_2O_3$/0.125 | $TiO_2$/4.5 $SnO_2$/0.5 | $Nb_2O_5$/0.375 |
| Example 14 | $Li_2CO_3$/1.0 | $Na_2CO_3$/0.75 | $Y_2O_3$/0.125 | $TiO_2$/5.0 | $Nb_2O_5$/0.325 $V_2O_5$/0.05 |
| Example 15 | $Li_2CO_3$/1.0 | $Na_2CO_3$/0.75 | $Y_2O_3$/0.125 | $TiO_2$/5.0 | $Nb_2O_5$/0.325 $Ta_2O_5$/0.05 |
| Example 16 | $Li_2CO_3$/1.0 | $Na_2CO_3$/0.7 | $Y_2O_3$/0.125 | $TiO_2$/5.0 | $Nb_2O_5$/0.325 $MoO_3$/0.1 |
| Example 17 | $Li_2CO_3$/1.0 | $Na_2CO_3$/0.7 | $Y_2O_3$/0.125 | $TiO_2$/5.0 | $Nb_2O_5$/0.325 $WO_3$/0.1 |
| Example 18 | $Li_2CO_3$/1.0 | $Na_2CO_3$/0.85 | $Y_2O_3$/0.125 | $TiO_2$/5.0 | $Nb_2O_5$/0.325 $Fe_2O_3$/0.05 |
| Example 19 | $Li_2CO_3$/1.0 | $Na_2CO_3$/0.85 | $Y_2O_3$/0.125 | $TiO_2$/5.0 | $Nb_2O_5$/0.325 $Co_2O_3$/0.05 |
| Example 20 | $Li_2CO_3$/1.0 | $Na_2CO_3$/0.85 | $Y_2O_3$/0.125 | $TiO_2$/5.0 | $Nb_2O_5$/0.325 $Cr_2O_3$/0.05 |
| Example 21 | $Li_2CO_3$/1.0 | $Na_2CO_3$/0.85 | $Y_2O_3$/0.125 | $TiO_2$/5.0 | $Nb_2O_5$/0.325 $Mn_2O_3$/0.05 |
| Example 22 | $Li_2CO_3$/1.0 | $Na_2CO_3$/0.85 | $Y_2O_3$/0.125 | $TiO_2$/5.0 | $Nb_2O_5$/0.325 $Ni_2O_3$/0.05 |
| Example 23 | $Li_2CO_3$/1.0 | $Na_2CO_3$/0.85 | $Y_2O_3$/0.125 | $TiO_2$/5.0 | $Nb_2O_5$/0.325 $Al_2O_3$/0.05 |
| Example 24 | $Li_2CO_3$/1.1 | $Na_2CO_3$/0.75 | $Y_2O_3$/0.125 | $TiO_2$/5.0 | $Nb_2O5$/0.375 |
| Example 25 | $Li_2CO_3$/1.0 | $Na_2CO_3$/1.0 | $Y_2O_3$/0.05 | $TiO_2$/5.8 | $Nb_2O_5$/0.05 |
| Example 26 | $Li_2CO_3$/1.0 | $SrCO_3$/0.3 $Na_2CO_3$/0.35 | $Y_2O_3$/0.075 | $TiO_2$/5.0 | $Nb_2O_5$/0.425 |
| Example 27 | $Li_2CO_3$/1.0 | $SrCO_3$/0.5 $Na_2CO_3$/0.25 | $Y_2O_3$/0.125 | $TiO_2$/5.0 | $Nb_2O_5$/0.375 |
| Example 28 | $Li_2CO_3$/1.0 | $SrCO_3$/0.8 $Na_2CO_3$/0.1 | $Y_2O_3$/0.2 | $TiO_2$/5.0 | $Nb_2O_5$/0.3 |
| Example 29 | $Li_2CO_3$/1.0 | $SrCO_3$/1.0 | $Y_2O_3$/0.05 | $TiO_2$/5.8 | $Nb_2O_5$/0.05 |
| Example 30 | $Li_2CO_3$/1.0 | $CaCO_3$/0.5 $Na_2CO_3$/0.25 | $Y_2O_3$/0.125 | $TiO_2$/5.0 | $Nb_2O_5$/0.375 |
| Example 31 | $Li_2CO_3$/1.0 | $BaCO_3$/0.5 $Na2CO_3$/0.25 | $Y_2O_3$/0.125 | $TiO_2$/5.0 | $Nb_2O_5$/0.375 |

<Powder X-Ray Diffraction>

Each of the composite oxides obtained in Examples 1 to 31 and Comparative Examples 1 to 4 was packed in a standard glass holder having a diameter of 25 mm, and measured by powder X-Ray diffraction using the above-described method. The results are shown in Table 3.

As a specific example, the result of the powder X-Ray diffraction on the composite oxide of Example 1 is described. As indicated in Table 3, the composite oxide of Example 1 was a titanium-including composite oxide having the crystal structure belonging to the space group Fmmm, and is represented by the general formula $Li_2Na_{1.2}Ti_5(Y_{0.1}Nb_{0.9})O_{14}$. In addition, in the XRD chart, the composite oxide of Example 1 showed a strong peak top $I_L$ of the diffraction line at 18.10°, and a peak top $I_H$ of the diffraction line at 19.12°. The intensity ratio $I_L/I_H$ was found to be 2.64 as determined by dividing the intensity value of the intensity $I_L$ (count per unit time: cps) by the intensity value of the intensity $I_H$ (cps).

As shown in Table 3, in any of the composite oxides of Examples 1 to 4, and 6 to 31, the diffraction peak intensity ratio $I_L/I_H$ was within the range of from 0.16 to 3.15 as measured by powder X-Ray diffraction. On the other hand, the $I_L/I_H$ for the composite oxides of Examples 5 and Comparative Examples 1 and 2 were outside the range. For example, the diffraction line intensity ratio $I_L/I_H$ obtained for the composite oxide of Example 5 was 3.20.

<Vacancy Amount>

In the above-described procedure, the composite oxides of Examples 1 to 31 and Comparative Examples 1 to 4 were measured by powder X-Ray diffraction, and the site occupancy in the crystal structure thereof were investigated by Rietveld analysis. Specifically, the occupancy in the M1 site in each corresponding space group was examined for the titanium-including composite oxide represented by the general formula $Li_{2+a}M1_{2-b}Ti_{6-c}Y_dM2_eO_{14+\delta}$. The fitting parameter S resulting from the Rietveld analysis was within the range of 1.35 to 1.75. Table 3 shows the results of M1 site occupancies refined by Rietveld analysis. As a specific example, when the composite oxide of Example 1 was examined for the site occupancy of Na using Rietveld analysis, as shown in Table 3, the Na occupancy was 60.2% in the obtained result. In this manner, it was found that vacancies had been introduced into the Na sites (M1 sites) in the composite oxide of Example 1.

Note that, for the composite oxides of Examples 1 to 31 and Comparative Examples 1 to 4, as shown in Table 1, it had been found that the subscript a in the above-described general formula was approximately 0 from the results of ICP analysis and such, therefore found beforehand that the occupancy of Li (subscript 2+a) was approximately 2. Therefore, the use of the occupancy of Li in the crystal structure was deemed as being inappropriate for the evaluation of the vacancy amount in these composite oxides. For this reason, as described above, the occupancy of the element M1 was determined for sites which should be occupied by the element M1 in each space group, and used as the index of the vacancy amount.

Table 3 summarizes for the titanium-including composite oxides in Examples 1 to 31 and Comparative Examples 1 to 4, the space groups, the $I_L$ and $I_H$ peak positions (2θ/deg) in the diffraction patterns of each phase, the diffraction peak intensity ratio, and the occupancy in the M1 site. Note that, since the composite oxides obtained in Examples 1 to 26 have the symmetry of the space group Fmmm, the value of the diffraction peak intensity ratio $I_L/I_H$ in Table 3 can be defined as the diffraction peak intensity ratio $I_{L2}/I_{H2}$. In addition, since the composite oxides obtained in Examples 28 and 29 have the symmetry of the space group Cmca, the value of the diffraction peak intensity ratio $I_L/I_H$ can be defined as the diffraction peak intensity ratio $I_{L1}/I_{H1}$. As shown in Table 3, the composite oxides obtained in Examples 27, 30, and 31 included a phase having the symmetry of the space group Fmmm, and a phase having the symmetry of the space group Cmca. The diffraction peak intensity $I_L$ obtained for these composite oxides can be considered as being the average of $I_{L1}$ and $I_{L2}$, and the intensity $I_H$ can be considered as being the average of $I_{H1}$ and $I_{H2}$.

TABLE 3

| | Space group | $I_L$ 2θ (/deg) | $I_H$ 2θ (/deg) | Diffraction peak intensity ratio $I_L/I_H$ | Occupancy of M1 site (%) |
|---|---|---|---|---|---|
| Comparative Example 1 | Fmmm | 18.14 | 19.09 | 3.16 | 100 |
| Comparative Example 2 | Cmca | 18.27 | 19.25 | 0.59 | 100 |
| Comparative Example 3 | Fmmm | 18.15 | 19.14 | 2.55 | 74.8 |
| Comparative Example 4 | Cmca | 18.22 | 19.21 | 1.07 | 100 |
| Example 1 | Fmmm | 18.10 | 19.12 | 2.64 | 60.2 |
| Example 2 | Fmmm | 18.10 | 19.08 | 2.66 | 75.0 |
| Example 3 | Fmmm | 18.10 | 19.08 | 2.66 | 75.0 |
| Example 4 | Fmmm | 18.10 | 19.08 | 2.65 | 75.0 |
| Example 5 | FmMm | 18.10 | 19.09 | 3.20 | 75.1 |
| Example 6 | Fmmm | 18.14 | 19.10 | 2.68 | 89.5 |
| Example 7 | Fmmm | 18.01 | 19.02 | 3.15 | 5.5 |
| Example 8 | Fmmm | 18.04 | 19.03 | 3.07 | 5.5 |
| Example 9 | Fmmm | 18.09 | 19.07 | 2.73 | 75.2 |
| Example 10 | Fmmm | 18.10 | 19.09 | 2.51 | 75.0 |
| Example 11 | Fmmm | 18.12 | 19.10 | 2.65 | 74.9 |
| Example 12 | Fmmm | 18.11 | 19.10 | 2.70 | 75.0 |
| Example 13 | Fmmm | 18.09 | 19.08 | 2.78 | 75.1 |
| Example 14 | Fmmm | 18.09 | 19.09 | 2.75 | 74.9 |
| Example 15 | Fmmm | 18.11 | 19.10 | 2.68 | 75.1 |
| Example 16 | Fmmm | 18.10 | 19.09 | 2.95 | 75.0 |
| Example 17 | Fmmm | 18.09 | 19.08 | 3.01 | 74.8 |
| Example 18 | Fmmm | 18.12 | 19.11 | 2.70 | 84.9 |
| Example 19 | Fmmm | 18.13 | 19.12 | 2.69 | 85.1 |
| Example 20 | Fmmm | 18.14 | 19.13 | 2.68 | 85.0 |
| Example 21 | Fmmm | 18.12 | 19.10 | 2.59 | 85.1 |
| Example 22 | Fmmm | 18.13 | 19.11 | 2.63 | 84.9 |
| Example 23 | Fmmm | 18.11 | 19.10 | 2.70 | 85.0 |
| Example 24 | Fmmm | 18.09 | 19.07 | 2.61 | 84.8 |
| Example 25 | Fmmm | 18.17 | 19.12 | 2.25 | 100 |
| Example 26 | Fmmm | 18.17 | 19.17 | 2.07 | 100 |
| Example 27 | Fmmm + Cmca | 18.17 | 19.14 | 1.63 | 100 |
| Example 28 | Cmca | 18.17 | 19.12 | 1.13 | 100 |
| Example 29 | Cmca | 18.06 | 19.06 | 0.69 | 100 |
| Example 30 | Fmmm + Cmca | 18.19 | 19.16 | 1.59 | 100 |
| Example 31 | Fmmm + Cmca | 18.12 | 19.11 | 1.64 | 100 |

<Measurement of Battery Performance>

Each of the beaker cells of Examples 1 to 31 and Comparative Examples 1 to 4 was charged at a constant current-constant voltage condition of 0.2 C and 1 V for 10 hours in an environment at 25° C., thereby inserting Li into the active material. Subsequently, these beaker cells were discharged at a constant current of 0.2 C until the cell voltage reached 3 V, thereby extracting Li from the active material. At this time, the coulomb efficiency obtained by dividing the coulomb amount (amount of the current) during initial Li extraction (at the time of initial discharge), i.e., the initial discharge capacity, by the coulomb amount (amount of the current) during initial Li insertion (at the time of initial charge) was defined as the initial charge-discharge efficiency (%). Table 4 shows the initial discharge capacity and initial charge-discharge efficiency determined for each beaker cell.

Thereafter, the second charge and discharge were carried out under similar conditions, and the discharge capacity at the time of Li extraction until the cell voltage reached 3 V at the constant current of 0.2 C in the second charge-discharge cycle was defined as the 0.2 C discharge capacity. Next, Li insertion was carried out under a constant current-constant voltage condition at 0.2 C and 1 V for 10 hours, then Li extraction was carried out at a constant current of 10 C until the cell voltage reached 3 V. The discharge capacity at this time was defined as the 10 C discharge capacity. Table 4 shows the ratio of the 10 C discharge capacity to the 0.2 C discharge capacity, i.e., the 10 C/0.2 C discharge capacity ratio.

Next, the beaker cells of Examples 1 to 31 and Comparative Examples 1 to 4 were subjected to 100 times of charge-discharge cycles. One charge-discharge cycle included charging under constant current-constant voltage condition at 0.2 C and 1 V for 10 hours, and discharging at a constant current of 0.2 C until the cell voltage reached 3 V. Table 4 shows the capacity retention ratio (=capacity at 100th time/initial capacity×100[%]) as the index of life performance of the active material.

TABLE 4

|  | Initial discharge capacity (mAh/g) | Initial charge-discharge efficiency (%) | 10 C/0.2 C discharge ratio | Capacity retention ratio after 100 cycles (%) | Potential at SOC 50% (V vs. Li$^+$/Li) |
|---|---|---|---|---|---|
| Comparative Example 1 | 90.8 | 92.0 | 89.8 | 90.5 | 1.28 |
| Comparative Example 2 | 106.8 | 92.1 | 89.3 | 89.5 | 1.43 |
| Comparative Example 3 | 131.5 | 93.1 | 92.9 | 93.3 | 1.35 |
| Comparative Example 4 | 116.7 | 92.3 | 90.7 | 93.0 | 1.42 |
| Example 1 | 129.4 | 93.1 | 92.6 | 93.4 | 1.34 |
| Example 2 | 132.9 | 93.6 | 93.1 | 93.5 | 1.32 |
| Example 3 | 133.2 | 93.2 | 93.5 | 94.1 | 1.32 |
| Example 4 | 133.4 | 93.3 | 94.3 | 94.5 | 1.39 |
| Example 5 | 130.5 | 93.0 | 92.5 | 91.8 | 1.32 |
| Example 6 | 119.2 | 93.5 | 93.2 | 93.8 | 1.27 |
| Example 7 | 95.3 | 92.0 | 91.6 | 93.9 | 1.41 |
| Example 8 | 96.4 | 91.8 | 91.5 | 93.6 | 1.41 |
| Example 9 | 133.5 | 93.4 | 93.7 | 94.2 | 1.32 |
| Example 10 | 131.8 | 93.5 | 93.2 | 94.1 | 1.32 |
| Example 11 | 133.3 | 93.2 | 93.6 | 95.0 | 1.32 |
| Example 12 | 130.9 | 93.3 | 93.5 | 94.4 | 1.32 |
| Example 13 | 133.1 | 93.0 | 93.4 | 94.1 | 1.31 |
| Example 14 | 136.1 | 93.9 | 94.4 | 94.3 | 1.31 |
| Example 15 | 130.0 | 93.8 | 93.8 | 93.6 | 1.31 |
| Example 16 | 136.5 | 94.2 | 94.5 | 94.4 | 1.31 |
| Example 17 | 132.7 | 93.9 | 94.0 | 93.9 | 1.31 |
| Example 18 | 120.3 | 93.8 | 94.6 | 92.8 | 1.27 |
| Example 19 | 121.9 | 93.6 | 94.5 | 92.7 | 1.27 |
| Example 20 | 120.5 | 93.3 | 94.1 | 92.5 | 1.27 |
| Example 21 | 120.3 | 93.4 | 94.3 | 93.1 | 1.27 |
| Example 22 | 121.6 | 93.7 | 94.2 | 92.9 | 1.27 |
| Example 23 | 120.8 | 93.2 | 94.0 | 93.0 | 1.27 |
| Example 24 | 133.1 | 94.6 | 93.5 | 94.1 | 1.32 |
| Example 25 | 92.6 | 93.0 | 91.8 | 93.7 | 1.26 |
| Example 26 | 133.7 | 93.8 | 93.9 | 93.6 | 1.39 |
| Example 27 | 128.6 | 93.5 | 93.6 | 93.8 | 1.39 |
| Example 28 | 118.5 | 92.9 | 92.8 | 94.2 | 1.39 |
| Example 29 | 106.8 | 92.1 | 90.5 | 94.5 | 1.41 |
| Example 30 | 115.8 | 92.3 | 90.3 | 89.8 | 1.41 |
| Example 31 | 116.2 | 92.5 | 90.8 | 90.3 | 1.41 |

The results shown in Tables 3 and 4 indicate that the beaker cells using the composite oxides of Examples 1 to 31 as active materials exhibited lower electrode potentials and higher initial discharge capacities than those using the composite oxides of Comparative Examples 1, 2, and 4. In addition, the beaker cells using the composite oxides of Examples 1 to 31 exhibited high rate performance and marked life performance. These results indicate that the use of the composite oxides of Examples 1 to 31 as battery active materials allows achievement of a high energy density and marked life performance.

In addition, from Tables 1, 3, and 4, there can be seen a trend where the introduction of vacancies into the crystal structure of the composite oxide increases the capacity, and substitution with Y decreases the electrode potential (vs. Li/Li$^+$). Furthermore, it ca be seen that substitution with an element other than Y leads to higher rate performance and life performance. In addition, the results in Examples 2 and 3 indicate that the carbon coating on the surface of the composite oxide further improves the performance for a battery active material.

In addition, from the comparison between Comparative Example 3 and Example 2, in which the amounts of vacancies and Na that are present in the crystal lattice are the same, there can be seen a trend where substitution with Y decreases the electrode potential (vs. Li/Li$^+$). Introduction of vacancies into the crystal structure of the composite oxide represented by the general formula Li$_{2+a}$SrTi$_6$O$_{14}$ requires the introduction of high valence transition metal ions such as Nb, in order to maintain neutrality of electric charges. However, as described above, the high valence transition metal ions decrease the Fermi level, whereby the electrode potential (vs. Li/Li$^+$) of the composite oxide is increased. More specifically, conventionally, the increase of the electrode capacity caused an increase the electrode potential, which results in the decrease of the battery voltage, and hinders the improvement of the energy density. The comparison between the results of Comparative Example 3 and Example 2 indicates that the substitution with Y achieves the effect of reducing the influence of the high valence transition metals on the Fermi level. This indicates that, in cases of having the same vacancy amount and Na amount, which are considered as control factors of the electrode capacity and electrode potential of the composite oxide, the electrode potential decreases and the energy density improves due to the effect of substitution with Y.

Example 32

In Example 32, a nonaqueous electrolyte battery was produced by the following method.
<Production of Negative Electrode>
First, particles of the composite oxide of Example 2 were ground to obtain a ground product having an average particle size of 5 μm or less. Next, acetylene black as a conductive agent was added in a proportion of 6 parts by mass with reference to 100 parts by mass of the composite oxide, thereby obtaining a mixture. Subsequently, the mixture was dispersed in NMP (N-methyl-2-pyrrolidone) to obtain a dispersion. The dispersion was mixed with polyvinylidene fluoride (PVdF) as a binder in a proportion of 10 parts by mass with reference to the composite oxide of Example 2, thereby preparing a negative electrode slurry. The slurry was applied using a blade onto a current collector made of an aluminum foil. The slurry on the current collector was dried at 130° C. for 12 hours under vacuum, and rolled such that the electrode layer would have a density of 2.2 g/cm$^3$ (excluding the current collector), thereby obtaining a negative electrode.

<Production of Positive Electrode>

100 parts by mass of a commercially available spinel lithium manganese oxide ($LiMn_2O_4$) were mixed with 5 parts by mass of acetylene black as a conductive agent, thereby obtaining a mixture. Subsequently, the mixture was dispersed in NMP to obtain a dispersion. The dispersion was mixed with PVdF as a binder in a proportion of 5 parts by mass with reference to lithium manganese oxide, thereby obtaining a positive electrode slurry. The slurry was applied using a blade onto a current collector made of an aluminum foil. The slurry on the current collector was dried at 130° C. for 12 hours under vacuum, and rolled such that the electrode layer would have a density of 2.1 g/cm$^3$ (excluding the current collector), thereby obtaining a positive electrode.

<Production of Electrode Group>

The positive electrode and negative electrode produced as described above were stacked with a polyethylene separator sandwiched therebetween, thereby obtaining a stack. Subsequently, the stack was wound, and further pressed to obtain a flat-shaped wound electrode group. A positive electrode terminal and a negative electrode terminal were connected to the electrode group.

<Preparation of Nonaqueous Electrolyte>

As a mixed solvent, a mixed solvent of ethylene carbonate and diethyl carbonate (volume ratio 1:1) was provided. Lithium hexafluorophosphate ($LiPF_6$) was dissolved in the solvent at a concentration of 1 M. In this manner, a nonaqueous electrolyte was prepared.

<Assembly of Nonaqueous Electrolyte>

The nonaqueous electrolyte battery of Example 32 was produced using the electrode group and nonaqueous electrolyte produced as described above.

<Charge-Discharge Test>

The nonaqueous electrolyte battery of Example 32 thus produced was subjected to charge-discharge test at room temperature. The charge-discharge test was carried out at a cell voltage within the range of 1.8 V to 3.1 V, and a charge-discharge current value of 0.2 C (hourly discharge rate).

FIG. 10 shows the discharge curve of the nonaqueous electrolyte battery of Example 32. As is evident from FIG. 10, the nonaqueous electrolyte battery of Example 32 was found to operate in the voltage range of 2.3 V to 3.0 V.

Example 33

In Example 33, a battery pack was produced by electrically connecting five nonaqueous electrolyte batteries of Example 32 in series. The battery pack thus produced was subjected to charge-discharge test at room temperature. The charge-discharge test was carried out within the voltage range of 9.0 V to 15.5 V in terms of the pack voltage having five cells connected in series, and at a charge-discharge current of 0.2 C (hourly discharge rate). FIG. 11 shows the discharge curve of the battery pack thus obtained.

The result shown in FIG. 11 indicates that the use of the composite oxide of Example 2 as a negative electrode active material allows obtaining of a battery pack that exhibits an average operating voltage of about 13.5 V with five cells connected in series. In addition, FIG. 11 indicates that the shape of the flat part of the voltage in the discharge curve of the battery pack is of a smooth and moderate incline. More specifically, this indicates that by using the active material of Example 2 as a negative electrode, and thus increasing the average operating voltage as described above, even with the number of cells connected in series set to five, there was obtained a low cost, low resistance, small size, and high energy density battery pack which has a high potential having good compatibility toward a 12 V lead storage battery for automobiles.

According to at least one of the above-described embodiments and examples, an active material includes a composite oxide that includes in an orthorhombic crystal structure thereof, yttrium atoms and at least one selected from the group consisting of alkali metal atoms and alkaline earth metal atoms, wherein, among crystal sites represented by Wyckoff notations in the orthorhombic crystal structure, an occupancy of crystal sites that can be occupied by the alkali metal atoms or the alkaline earth metal atoms is less than 100%. In addition, according to at least one of the above-described embodiments and examples, an active material has an orthorhombic crystal structure, and includes a composite oxide represented by the general formula $Li_{2+a}M1_{2-b}Ti_{6-c}Y_dM2_eO_{14+\delta}$. In the formula, M1 is at least one element selected from the group consisting of Sr, Ba, Ca, Mg, Na, Cs, Rb, and K, M2 is at least one element selected from the group consisting of Zr, Sn, V, Nb, Ta, Mo, W, Fe, Co, Cr, Mn, Ni, and Al, a is within the range of $0 \leq a \leq 6$, b is within the range of $0 \leq b < 2$, c is within the range of $0 < c < 6$, d is within the range of $0 < d < 6$, e is within the range of $0 \leq e < 6$, and δ is within the range of $-0.5 \leq \delta \leq 0.5$. As a result, the active material can realize a nonaqueous electrolyte battery which exhibits a high energy density and a high battery voltage, has marked life performance, and where voltage management is easy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material, comprising a composite oxide comprising yttrium atoms and at least one selected from the group consisting of alkali metal atoms and alkaline earth metal atoms in an orthorhombic crystal structure thereof, wherein, among crystal sites represented by Wyckoff notations in the orthorhombic crystal structure, an occupancy of the crystal sites that can be occupied by the alkali metal atoms or the alkaline earth metal atoms is less than 100%.

2. An active material, comprising a composite oxide having an orthorhombic crystal structure, the composite oxide being represented by formula $Li_{2+a}M1_{2-b}Ti_{6-c}Y_dM2_eO_{14+\delta}$:

wherein
- M1 is at least one element selected from the group consisting of Sr, Ba, Ca, Mg, Na, Cs, Rb, and K,
- M2 is at least one element selected from the group consisting of Zr, Sn, V, Nb, Ta, Mo, W, Fe, Co, Cr, Mn, Ni, and Al,
- a is within a range of $0 \leq a \leq 6$,
- b is within a range of $0 \leq b < 2$,
- c is within a range of $0 < c < 6$,
- d is within a range of $0 < d < 6$,
- e is within a range of $0 \leq e < 6$, and
- δ is within a range of $-0.5 \leq \delta \leq 0.5$.

3. The active material according to claim 2, wherein M2 is at least one element selected from the group consisting of Al, Fe, Zr, Sn, V, Nb, Ta, and Mo.

4. The active material according to claim 2, wherein in an X-ray diffraction pattern obtained by powder X-Ray diffraction using Cu-Kα rays on the composite oxide, an intensity ratio $I_L/I_H$ is within a range of $0.6 \leq I_L/I_H \leq 3.15$, wherein $I_L$ is an intensity of a diffraction peak of highest intensity among diffraction peaks appearing within a range of $17° \leq 2\theta \leq 18.5°$, and $I_H$ is an intensity of a diffraction peak of highest intensity among diffraction peaks appearing within a range of $18.5° \leq 2\theta \leq 19.5°$.

5. The active material according to claim 2, wherein
the orthorhombic crystal structure belongs to a space group Cmca, and
in an X-ray diffraction pattern obtained by powder X-Ray diffraction using Cu-Kα rays on the composite oxide, an intensity ratio $I_{L1}/I_{H1}$ is within a range of $0.6 \leq I_{L1}/I_{H1} \leq 3.15$, wherein $I_{L1}$ is an intensity of a diffraction peak having a higher intensity between diffraction peaks corresponding to a (112) plane and a (021) plane, and $I_{H1}$ is an intensity of a diffraction peak corresponding to a (220) plane.

6. The active material to claim 2, wherein
the orthorhombic crystal structure belongs to a space group Fmmm, and
in an X-ray diffraction pattern obtained by powder X-Ray diffraction using Cu-Kα rays on the composite oxide, an intensity ratio $I_{L2}/I_{H2}$ is within a range of $0.6 \leq I_{L2}/I_{H2} \leq 3.15$, wherein $I_{L2}$ is an intensity of a diffraction peak corresponding to a (111) plane, and $I_{H2}$ is an intensity of a diffraction peak corresponding to a (202) plane.

7. The active material according to claim 2, wherein the composite oxide is represented by a general formula $Li_{2+a}Sr_{2-b}Na_{b-1}Ti_{6-c}Y_dNb_eO_{14+\delta}$, a is within a range of $0 < a \leq 6$, b is within a range of $1 \leq b < 2$, c is within a range of $0 < c < 6$, d is within a range of $0 < d < 6$, e is within a range of $0 < e < 6$, and δ is within a range of $-0.5 \leq \delta \leq 0.5$.

8. The active material according to claim 2, wherein the composite oxide is represented by a general formula $Li_{2+a}Na_{2-b}Ti_{6-c}Y_dNb_eO_{14+\delta}$, a is within a range of $0 \leq a \leq 6$, b is within a range of $0 < b < 2$, c is within a range of $0 < c < 6$, d is within a range of $0 < d < 6$, e is within a range of $0 < e < 6$, and δ is within a range of $-0.5 \leq \delta \leq 0.5$.

9. A nonaqueous electrolyte battery comprising:
a negative electrode comprising the active material according to claim 2;
a positive electrode; and
a nonaqueous electrolyte.

10. A battery pack comprising the nonaqueous electrolyte battery according to claim 9.

11. The battery pack according to claim 10 further comprising:
an external power distribution terminal; and
a protective circuit.

12. The battery pack according to claim 10, comprising a plurality of the nonaqueous electrolyte batteries, the nonaqueous electrolyte batteries being electrically connected in series, in parallel, or in a combination of in a series and in parallel.

13. A vehicle comprising the battery pack according to claim 10.

14. The vehicle according to claim 13, wherein the battery pack is configured to recover a regenerative energy of a power of the vehicle.

* * * * *